(12) United States Patent
Husain

(10) Patent No.: US 12,387,105 B2
(45) Date of Patent: Aug. 12, 2025

(54) EXECUTING A GENETIC ALGORITHM ON A LOW-POWER CONTROLLER

(71) Applicant: SparkCognition, Inc., Austin, TX (US)

(72) Inventor: Syed Mohammad Amir Husain, Georgetown, TX (US)

(73) Assignee: AVATHON, INC., Austin, TX (US)

( * ) Notice: Subject to any disclaimer, the term of this patent is extended or adjusted under 35 U.S.C. 154(b) by 0 days.

(21) Appl. No.: 18/520,192

(22) Filed: Nov. 27, 2023

(65) Prior Publication Data

US 2024/0095535 A1    Mar. 21, 2024

Related U.S. Application Data

(63) Continuation of application No. 17/017,065, filed on Sep. 10, 2020, now Pat. No. 11,829,883.

(60) Provisional application No. 62/915,921, filed on Oct. 16, 2019.

(51) Int. Cl.
    *G06N 3/084*      (2023.01)
    *G06N 3/126*      (2023.01)

(52) U.S. Cl.
    CPC ............ *G06N 3/084* (2013.01); *G06N 3/126* (2013.01)

(58) Field of Classification Search
    CPC ............................... G06N 3/084; G06N 3/126
    See application file for complete search history.

(56) References Cited

U.S. PATENT DOCUMENTS

| 2018/0314938 A1 | 11/2018 | Andoni et al. |
| 2020/0074472 A1 | 3/2020 | Adjaoute |

FOREIGN PATENT DOCUMENTS

| CN | 105303252 A | 2/2016 |
| CN | 109685060 A | 4/2019 |

OTHER PUBLICATIONS

Shaul et al. ("No More Pesty Learning Rate", arXiv:1206.1106v2 [stat. ML] Feb. 18, 2013, pp. 14.*

(Continued)

*Primary Examiner* — Li Wu Chang
(74) *Attorney, Agent, or Firm* — Moore IP Law

(57) ABSTRACT

A method includes selecting a subset of models from a plurality of models. The plurality of models is generated based on a genetic algorithm and corresponds to a first epoch of the genetic algorithm. Each of the plurality of models includes data representative of a neural network. The method includes performing at least one genetic operation of the genetic algorithm with respect to at least one model of the subset to generate a trainable model. The method includes determining a rate of improvement associated with prior backpropagation iterations. The method includes selecting, based on the rate of improvement, one of the trainable model or a prior trainable model as a selected trainable model. The method includes generating the trained model including training the selected trainable model. The method includes adding the trained model as input to a second epoch of the genetic algorithm that is subsequent to the first epoch.

20 Claims, 11 Drawing Sheets

(56) References Cited

OTHER PUBLICATIONS

Kuo "A sales forecasting system based on fuzzy neural network with initial weights generated by genetic algorithm", EJOR, 2001, pp. 496-517.
Rashid et al. "A Hybrid of Artificial Bee Colony, Genetic Algorithm, and Neural Network for Diabetic Mellitus Diagnosing", ARO, 2018, pp. 55-64.
Tamilselvi et al. "A Unified Framework and Sequential Data Cleaning Approach for a Data Warehouse", IJCSNS, 2008, pp. 117-121.

* cited by examiner

Input set of 200 models at start of epoch N

300

350

Evaluate model fitness and cluster models into species based on genetic distance

360

Determine species fitness, identify "elite species," and remove stagnant species Identify "elite members" of "elite species" as well as "overall elites"

EXECUTING A GENETIC ALGORITHM ON A LOW-POWER CONTROLLER

CROSS-REFERENCE TO RELATED APPLICATION

The present application claims priority from U.S. patent application Ser. No. 17/017,065 filed Sep. 10, 2020, entitled "EXECUTING A GENETIC ALGORITHM ON A LOW-POWER CONTROLLER," which claims priority from U.S. Provisional Patent Application No. 62/915,921 filed Oct. 16, 2019, entitled "EXECUTING A GENETIC ALGORITHM ON A LOW-POWER CONTROLLER," which is incorporated by reference herein in its entirety.

BACKGROUND

Computers are often used to solve complex quantitative and qualitative problems. For problems that involve a large data set, a specially trained professional, known as a data scientist, is often hired. The data scientist interprets the data set and constructs models that can be processed by computers to solve the problem. However, hiring data scientists is cost prohibitive for many organizations.

For certain types of problems, advanced computing techniques, such as genetic algorithms or backpropagation, may be available to develop a model, such as a neural network, that is comparable in accuracy to a model that would be created by a data scientist. However, genetic algorithms may take a large number of iterations to converge on an acceptable neural network, and backpropagation may be slow when a large data set is being modeled or when the neural network includes a large number of nodes, connections, or layers.

In real-world applications, neural networks often have to be trained based on large amounts of data. Processing such a large amount of data can exceed the capabilities of certain controllers or processors, such as "low-power" controllers or processors. Special-purpose processors capable of processing large amounts of data for neural network training can be expensive and power-intensive.

SUMMARY

The present application describes automated model building systems and methods that utilize a genetic algorithm and selective backpropagation to generate and train a neural network in a manner that is compatible with the reduced power and memory constraints of low-power hardware, such as the types of controllers/processors that are often incorporated in sensors. The described automated model building techniques may enable a generalized approach to generating neural networks that can be applied for regression, classification, and reinforcement learning problems. Combining a genetic algorithm with selective backpropagation as described herein may enable generating a neural network that models a particular data set with acceptable accuracy and in less time than using genetic algorithms or backpropagation alone.

Various adaptations are disclosed to enable execution on low-power hardware. For example, memory usage and power consumption can be reduced by filtering input data (e.g., data received from and/or measured at sensors) and using the filtered data, rather than all of the data, as training data to train a neural network or other model. To illustrate, data points (e.g., input data points) that are relatively similar to data points already in a training data set may selectively be discarded. Input data can be processed in batches (e.g., in real-time or near-real-time) to reduce a maximum instantaneous memory footprint during neural network training. Backpropagation (or other optimization processes) may be performed faster (e.g., thereby reducing power consumption) by selectively updating connection weights of neural network nodes that have a relatively greater error contribution. Problems that may occur during backpropagation, such as convergence on local minima and weight vectors that are not converging, can be minimized or avoided by monitoring improvement rate and selectively "rolling back" some backpropagation iterations if a low improvement rate is detected.

As an illustrative, non-limiting example of using a genetic algorithm in conjunction with optimization, consider a home with four temperature sensors that periodically collect temperature readings in the living room (L), the dining room (D), the master bedroom (M), and the guest bedroom (G), respectively. In this example, a data set may include four columns, where each column corresponds to temperature readings from a particular sensor in a particular room, and where each row corresponds to a particular time at which the four sensors took a temperature reading. In some examples, each row of the data set corresponds to a data point in a vector space. It may be of interest to predict the temperature in one of the rooms, e.g., L, given the temperature in the other three rooms, e.g., D, M, and G. A neural network may be suitable for such a problem, where the neural network has temperatures for D, M, and/or G as input nodes and temperature for L as an output node. For example, a neural network that predicts an output value of the temperature of L with 90% accuracy given input values of the temperatures of D, M, and/or G may be an acceptable solution.

In accordance with the described techniques, a combination of a genetic algorithm and an optimization algorithm (such as backpropagation, a derivative free optimizer (DFO), an extreme learning machine (ELM) or similar optimizer) may be used to generate and then train a neural network. Moreover, in some examples, the disclosed low-power adaptations may enable the generation and training of the neural network to be performed at a low-power controller or processor, such as one in a temperature sensor itself, rather than at a higher-power personal computer or other similar device. It is to be understood that characterization of any system components of method steps as "optimizers" or "optimization trainers," and use of such terminology herein, is not to be interpreted as requiring such components or steps to generate optimal results to the extreme (e.g., 100% prediction or classification accuracy). Rather, use of such terms is to be interpreted as indicating an attempt generate an output that is improved in some fashion relative to an input. For example, an optimization trainer that receives a trainable model as input and outputs a trained model may attempt to improve a prediction or classification accuracy of the trainable model by modifying one or more attributes of the trainable model to generate the trained model.

Genetic algorithms are iterative adaptive search heuristics inspired by biological natural selection. The genetic algorithm may start with a population of random models that each define a neural network with different topology, weights, and activation functions. Over the course of several epochs (also known as generations), the models may be evolved using biology-inspired reproduction operations, such as crossover (e.g., combining characteristics of two neural networks), mutation (e.g., randomly modifying a characteristic of a neural network), stagnation/extinction (e.g., removing neural networks whose accuracy has not improved in several epochs), and selection (e.g., identifying the best performing neural networks via testing). In addition, the best performing models of an epoch may be selected for reproduction to generate a trainable model. The trainable model may be trained by an optimization trainer (e.g., using backpropagation) to generate a trained model. When the trained model is available, the trained model may be re-inserted into the genetic algorithm for continued evolution. Training a model that is generated by breeding the best performing population members of an epoch may serve to reinforce desired "genetic traits" (e.g., neural network topology, activation functions, connection weights, etc.), and introducing the trained model back into the genetic algorithm may lead the genetic algorithm to converge to an acceptably accurate solution (e.g., neural network) faster, for example because desired "genetic traits" are available for inheritance in later epochs of the genetic algorithm.

A system (or device) configured to generate and train a neural network may, in various examples, include a memory that stores a training data set and a plurality of data structures. For example, each data structure may be a model of a neural network that models the training data set. The system may also include at least one processor (or controller) that is configured to execute a recursive search. For example, the recursive search may be a genetic algorithm to generate a neural network that models the training data set. During a first iteration of the recursive search, the processor may determine a fitness value for each of the data structures (e.g., neural network models) based on at least a subset of the training data set. The processor may also select a subset of data structures based on their respective fitness values and may perform at least one of a crossover operation or a mutation operation with respect to at least one data structure of the subset to generate a trainable data structure. The processor may further provide the trainable data structure to an optimization trainer that is configured to train the trainable data structure based on a portion of the training data set to generate a trained structure and to provide the trained data structure as input to a second iteration of the recursive search that is subsequent to the first iteration.

The optimization trainer is configured to train the trainable data structure. In some examples, the optimization trainer determines error measures of nodes (or neurons) of a neural network and performs backpropagation by adjusting weights of connections associated with nodes having high error measures. Adjusting the weights of selected connections results in faster backpropagation with lower power consumption. In some examples, the optimization trainer is configured to use an optimization search to perform backpropagation. For example, the optimization trainer determines a rate of improvement associated with a first set of iterations of backpropagation. If the rate of improvement is too low, the optimization trainer can revert to a previous trainable data structure (e.g., prior to applying the first set of iterations of backpropagation) and train the previous trainable data structure by updating the weights in a different manner than previously updated (e.g., during the first set of iterations). The optimization search leads to a faster optimization (and lower power consumption) by enabling the optimization trainer to avoid local minima and avoid weight vectors that are not converging.

In accordance with low-power adaptations disclosed herein, in some examples, the system (or device) is configured to select the training data set from a larger input data set. As an example, the input data set can include classification data. The system determines a representative reference point (e.g., an average) that is representative of data points that correspond to a classifier result and that have already been added to the training data set. The system adds a new data point of the input data set to the training data set based on determining that the new data point is different enough (e.g., greater than a threshold distance in vector space) from the reference point. The system can disregard new data points of the input data set that are not far enough in vector space from the data points already in the training data set. In some examples, the system selects the training data set based on values of variables indicated by data points. To illustrate, if the training data set already includes first data points, and the input data set includes many second data points having values of a variable that are different from a reference (e.g., average) value for the first data points already in the training data set, the system adds at least some of the second data points to the training data set.

In some aspects, the system processes the input data set in batches. For example, the system can determine a how many data points in a first batch of the input data set indicate a value for a variable that is different from the reference value. If this count is high (e.g., higher than a threshold), the system can add the data points contributing to the count to the training data set. Processing the input data set in batches can reduce memory consumption because the system can store one or more batches of the input data set in memory at a time, rather than having to store an entire input data set in memory. Using such filtered training data may reduce training time and memory consumption because the remaining data points of the input training data do not have to be processed and can be discarded.

DETAILED DESCRIPTION

Figure 1A:
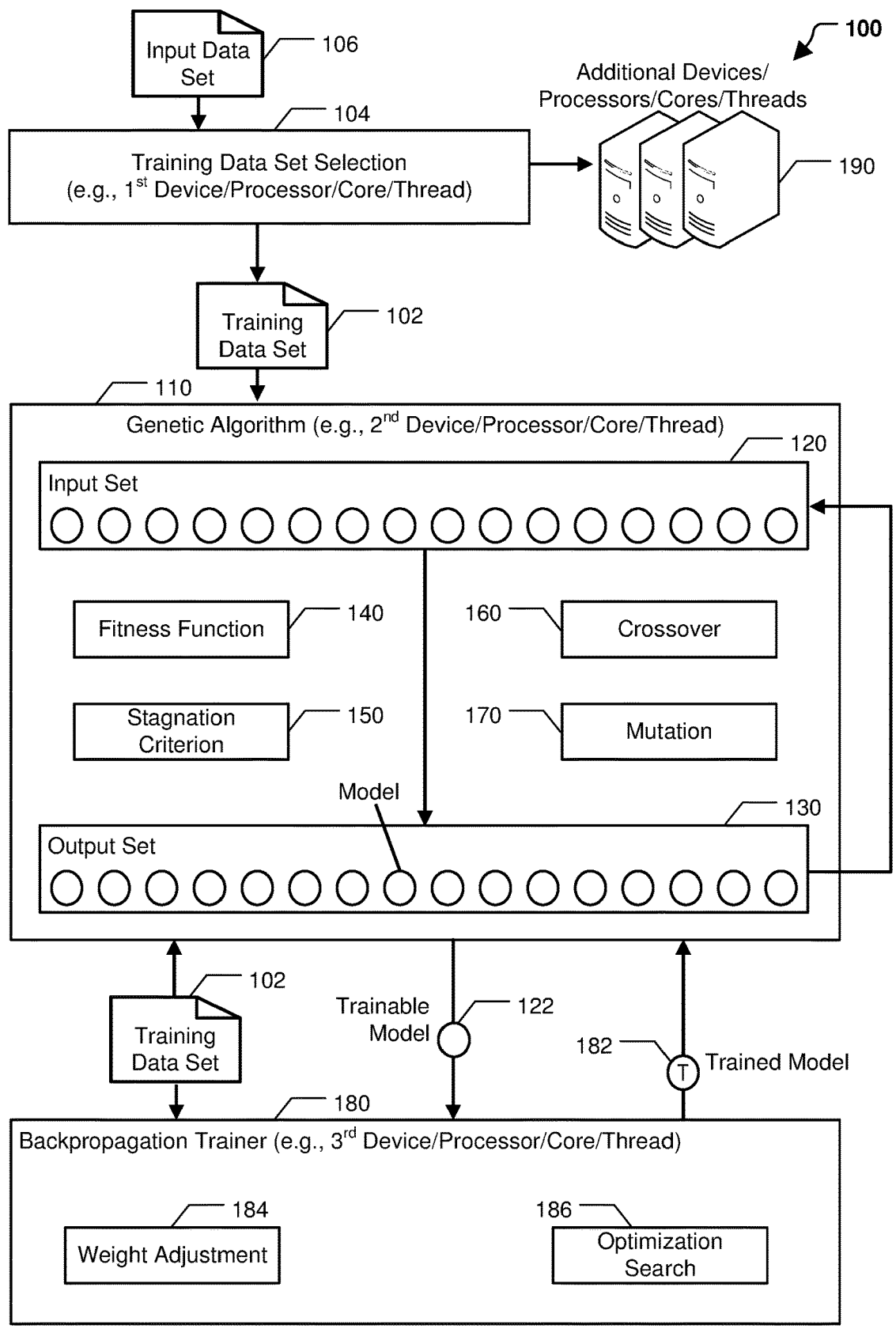
FIG. 1A illustrates a particular example of a system that is operable to support execution of a genetic algorithm on a low-power controller.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Referring to FIG. 1A, a particular illustrative example of a system 100 is shown. The system 100, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the system 100 includes a genetic algorithm 110 and a backpropagation trainer 180. The backpropagation trainer 180 is an example of an optimization trainer, and other examples of optimization trainers that may be used in conjunction with the described techniques include, but are not limited to, a derivative free optimizer (DFO), an extreme learning machine (ELM), etc. In particular aspects, the genetic algorithm 110 is executed on a different device, processor (e.g., central processor unit (CPU), graphics processing unit (GPU) or other type of processor), processor core, and/or thread (e.g., hardware or software thread) than the backpropagation trainer 180. The genetic algorithm 110 and the backpropagation trainer 180 may cooperate to automatically generate a neural network model of a particular data set, such as an illustrative training data set 102.

Figure 1B:
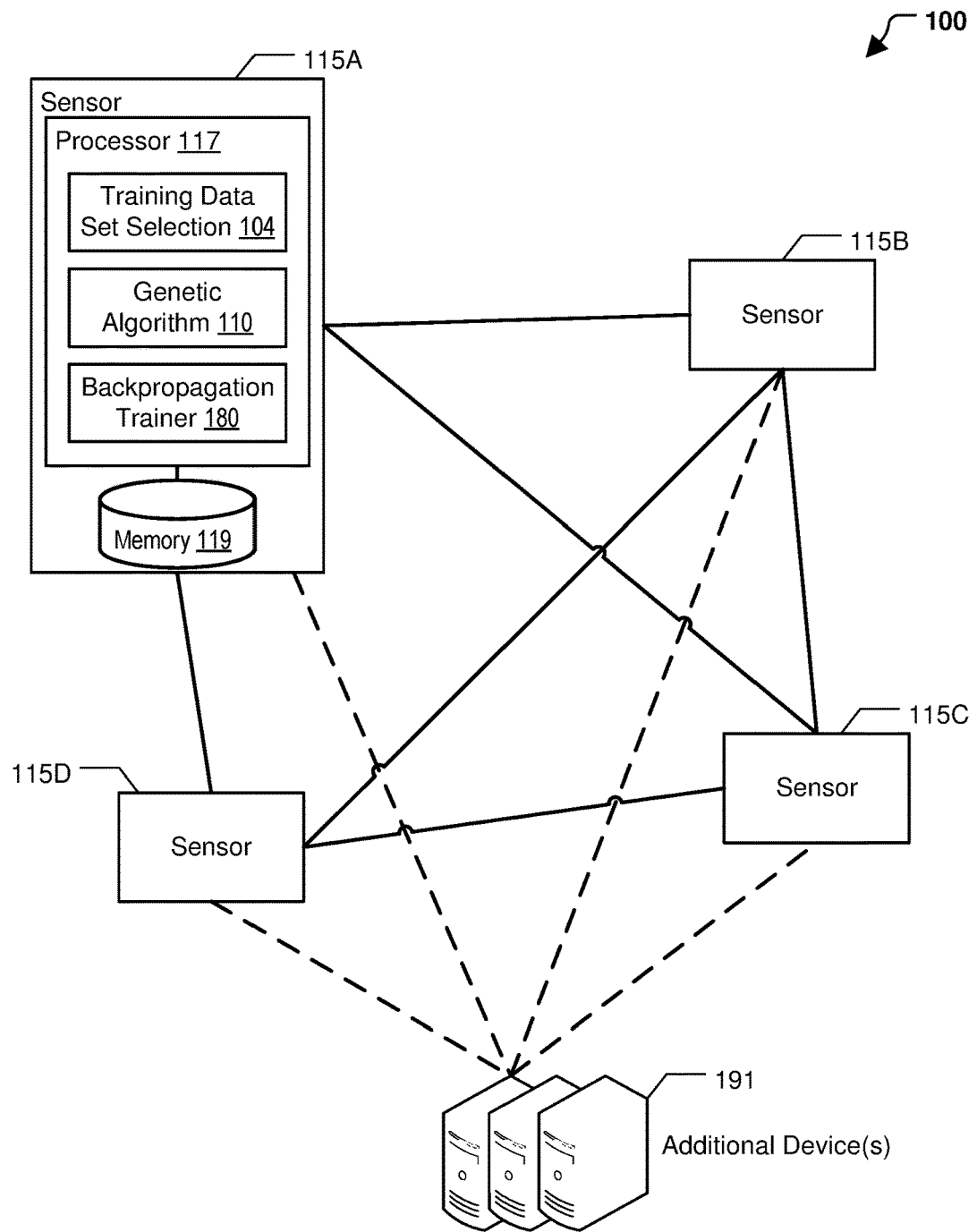
FIG. 1B illustrates another example of a system that is operable to support execution of a genetic algorithm on a low-power controller.

In some implementations, the system 100 includes training data set selection 104. The training data set selection 104 is performed to select the training data set 102 from (e.g., by filtering) an input data set 106. In particular aspects, the training data set selection 104 is executed on a different device, processor (e.g., central processor unit (CPU), graphics processing unit (GPU) or other type of processor), processor core, and/or thread (e.g., hardware or software thread) than the genetic algorithm 110, the backpropagation trainer 180, or both. Alternatively, the training data set selection 104, the genetic algorithm 110, and the backpropagation trainer 180 can be executed on the same device (e.g., a single device), which in some examples can be a low-power controller or processor, as further described herein. To illustrate, a particular, non-limiting example of the system 100 is shown in FIG. 1B. In the example in FIG. 1B, the system 100 includes a sensor 115A, a sensor 115B, a sensor 115C, and a sensor 115D. It should be understood that the system 100 of FIG. 1B including four sensors is provided as an illustrative example, in other examples the system 100 can include fewer than four sensors or more than four sensors. The sensor 115A includes a processor 117 (e.g., a low-power controller or processor) coupled to a memory 119 (e.g., an on-board memory). In a particular aspect, a size of the memory 119 is smaller than a size of the input data set 106 of FIG. 1A. For example, the memory 119 is configured to store batches of the input data set 106, but not all of the input data set 106, at any given time. The processor 117 is configured to execute the training data set selection 104, the genetic algorithm 110, the backpropagation trainer 180, or a combination thereof. In a particular aspect, each of the sensors 115A, 115B, 115C, and 115D is configured to independently train models. In another aspect, the sensor 115A is configured to provide the trained model 182 to one or more of the sensors 115B, 115C, or 115D.

The system 100 of FIG. 1B can include one or more additional devices 191. In some aspects, the additional device(s) 191 include more computational resources (e.g., memory, processing speed, etc.) than the processor 117. In a particular aspect, the processor 117 is configured to execute one or more of the training data set selection 104, the genetic algorithm 110, or the backpropagation trainer 180 and the additional device(s) 191 are configured to execute the remaining of the training data set selection 104, the genetic algorithm, 110 or the backpropagation trainer 180. In a particular implementation, the processor 117 is configured to perform the training data set selection 104 on batches of the input data set 106, to execute the genetic algorithm 110 on the training data set 102, and to provide the training data set 102 and the trainable model 122 to the additional device(s) 191. The additional device(s) 191 are configured to execute the backpropagation trainer 180 on the trainable model 122 and to provide the trained model 182 after some time as input to the genetic algorithm 110 of the processor 117. The additional device(s) 191 may thus enable the processor 117 to off-load some of the computational work associated with model training.

Returning to FIG. 1A, the system 100 may provide an automated model building process that enables even inexperienced users to quickly and easily build highly accurate models based on a specified data set. Additionally, the system 100 simplifies the neural network model to avoid overfitting and to reduce computing resources required to run the model.

The training data set selection 104 is used to select the training data set 102 from the input data set 106. In particular aspects, the input data set 106 corresponds to a stream of data received from one or more data sources, which may include sensors in an illustrative non-limiting example. To illustrate, the input data set 106 may include data received from sensors on a robotic arm. In a particular implementation, the input data set 106 includes classification data.

In some examples, the input data set 106 includes data points associated with classifier results. In a classification example, the training data set selection 104 may be performed per classifier result. To illustrate, consider a table of input data for a binary classification example. Each row of the table corresponds to sensor readings at a particular time. Each row includes an indication of whether the data is classified as "A" or "B." This classifier result can be stored in a single column (that has possible values of "A" or "B") or can be stored one-hot encoded in multiple rows (e.g., an "A" column having values of "0" or "1" and a "B" column having values of "0" or "1"). In this example, the training data set selection 104 may include comparing rows of the input data set 106 having an "A" classifier result to a reference point corresponding to "A" (e.g., the same classifier result). A difference, e.g., distance in vector space, between each row and the reference point may be compared to a threshold (e.g., a training threshold). If the distance for a row exceeds the threshold, the row may be likely to significantly impact model training, and the row may therefore be added to the training data set 102. In some examples, when a row is added, the reference point for the corresponding classifier result may also be updated before subsequent distances are determined. If the distance for a row does not exceed the threshold, the row may be less likely to significantly impact model training, and the row may therefore be filtered out, i.e., not added to the training data set 102. This process may also be performed for "B" rows using a different reference point for the "B" rows.

In a particular implementation, the training data set selection 104 is based on reference data corresponding to multiple variables. To illustrate, consider an example in which rows of the input data set 106 have values for three variables—X, Y, and Z. Reference values for X, Y, and Z, such as Ref_X, Ref_Y, and Ref_Z, may be determined based on data points (rows) already included in the training data set. In a particular aspect, the reference values are initialized to a default value (e.g., 0, −1, or 999999) when the training data set 102 is empty. Counts may be maintained for each of the variables, such as Count_X, Count_Y, and Count_Z. Count_X may be incremented (e.g., by 1) in response to determining that a difference between the value of X in a particular row (e.g., Row_i) and Ref_X is greater than a variable difference threshold, such as Thresh_X. Reference data may be updated to indicate that Row_i contributed to the first count. Rows may contribute to the counts of more than one variable. In one example, the training data set selection 104 includes, in response to determining that the count for a variable is greater than a count threshold (e.g., Thresh_count), adding to the training data set 102 rows of the input data set 106 that contributed to the count. In another example, the training data set selection 104 includes adding rows of the input data set 106 that caused incrementation to the counts of more than a threshold number of variables (e.g., Thresh_incrementedVariables).

In a particular aspect, the input data set 106 is processed in batches. For example, responsive to receiving a first batch of the input data set 106, reference data is updated to indicate first counts corresponding to the first batch of the input data set 106. Data points (i.e., rows) that contributed to a higher than threshold count are selected from the first batch and added to the training data set 102. The remaining data points of the first batch are discarded (e.g., marked for deletion). Additional batches may be processed in similar fashion. In a particular aspect, the training data set 102 is processed in batches by the genetic algorithm 110.

Storing and processing large amounts of input data can be expensive in terms of memory usage and processing cycles. The low-power adaptations provided by the training data set selection 104 can reduce resource utilization, for example by selecting the training data set 102 from the input data set 106 and disregarding the remaining portions of the input data set 106 that are predicted to not significantly impact model training and model generation. Further, processing the input data set 106, the training data set 102, or both in batches rather than all at once may reduce instantaneous memory consumption at any given time.

Operations of the genetic algorithm 110 are now described. The genetic algorithm 110 includes or is otherwise associated with a fitness function 140, a stagnation criterion 150, a crossover operation 160, and a mutation operation 170. As described above, the genetic algorithm 110 may represent a recursive search process. Consequently, each iteration of the search process (also called an epoch or generation of the genetic algorithm 110) may have an input set (or population) 120 and an output set (or population) 130. The input set 120 of an initial epoch of the genetic algorithm 110 may be randomly or pseudo-randomly generated. After that, the output set 130 of one epoch may be the input set 120 of the next (non-initial) epoch, as further described herein.

The input set 120 and the output set 130 may each include a plurality of models, where each model includes data representative of a neural network. For example, each model may specify a neural network by at least a neural network topology, a series of activation functions, and connection weights. The topology of a neural network may include a configuration of nodes of the neural network and connections between such nodes. The models may also be specified to include other parameters, including but not limited to bias values/functions and aggregation functions.

Figure 2:
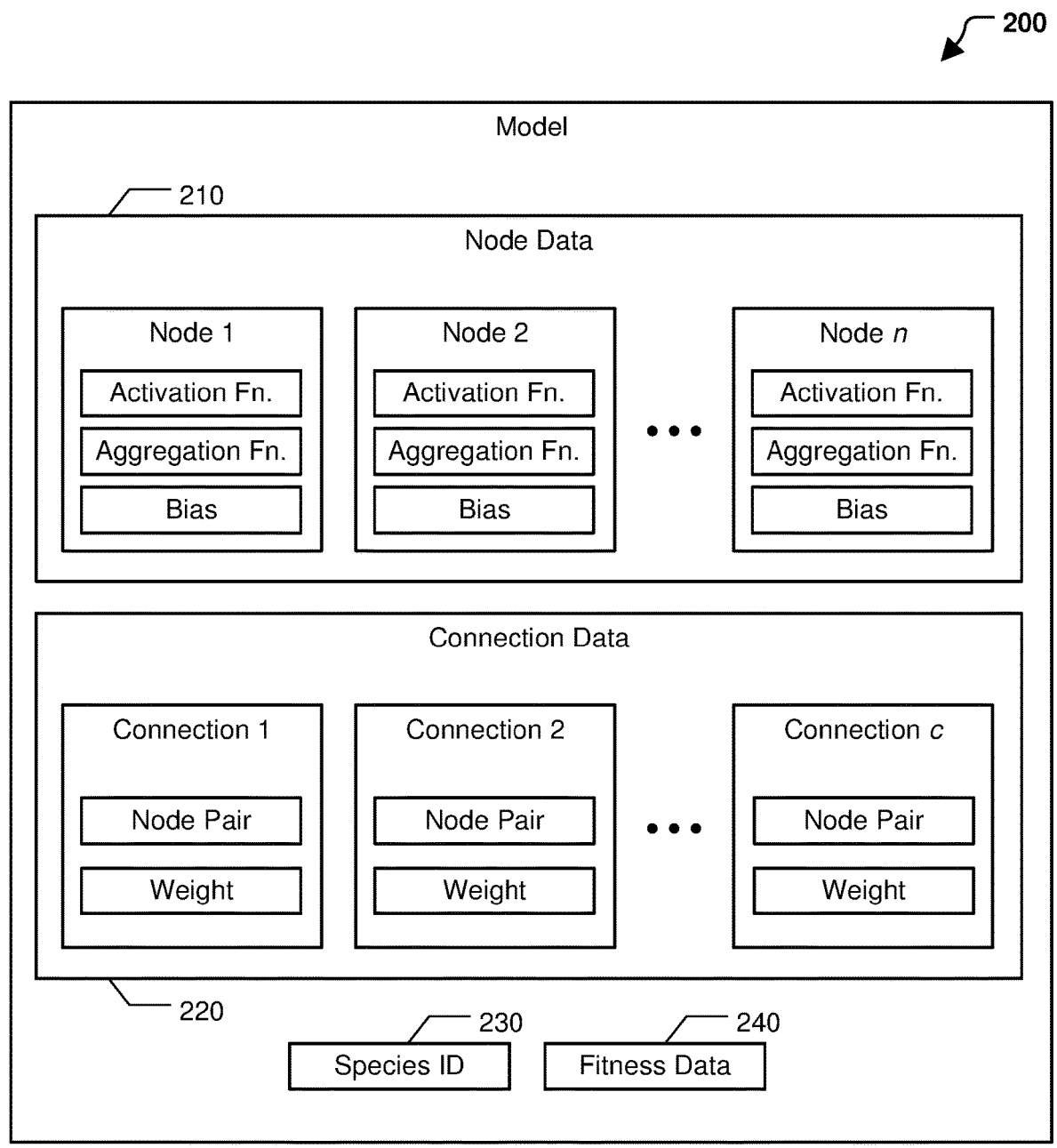
FIG. 2 illustrates a particular example of a model including data representative of a neural network.

Additional examples of neural network models are further described with reference to FIG. 2. In particular, as shown in FIG. 2, a model 200 may be a data structure that includes node data 210 and connection data 220. In the illustrated example, the node data 210 for each node of a neural network may include at least one of an activation function, an aggregation function, or a bias (e.g., a constant bias value or a bias function). The activation function of a node may be a step function, sine function, continuous or piecewise linear function, sigmoid function, hyperbolic tangent function, or other type of mathematical function that represents a threshold at which the node is activated. The biological analog to activation of a node is the firing of a neuron. The aggregation function may be a mathematical function that combines (e.g., sum, product, etc.) input signals to the node. An output of the aggregation function may be used as input to the activation function. The bias may be a constant value or function that is used by the aggregation function and/or the activation function to make the node more or less likely to be activated.

The connection data 220 for each connection in a neural network may include at least one of a node pair or a connection weight. For example, if a neural network includes a connection from node N1 to node N2, then the connection data 220 for that connection may include the node pair <N1, N2>. The connection weight may be a numerical quantity that influences if and/or how the output of N1 is modified before being input at N2. In the example of a recurrent network, a node may have a connection to itself (e.g., the connection data 220 may include the node pair <N1, N1>).

The model 200 may also include a species identifier (ID) 230 and fitness data 240. The species ID 230 may indicate which of a plurality of species the model 200 is classified in, as further described with reference to FIG. 3. The fitness data 240 may indicate how well the model 200 models the training data set 102. For example, the fitness data 240 may include a fitness value that is determined based on evaluating the fitness function 140 with respect to the model 200, as further described herein. Although FIG. 2 represents the model 200 in terms of node data 210 and connection data 220, in other examples, the model 200 can be represented in terms of layers or sets of layers.

Returning to FIG. 1A, the fitness function 140 may be an objective function that can be used to compare the models of the input set 120. In some examples, the fitness function 140 is based on a frequency and/or magnitude of errors produced by testing a model on the training data set 102. As a simple example, assume the training data set 102 includes ten rows, that the training data set 102 includes two columns denoted A and B, and that the models illustrated in FIG. 1A represent neural networks that output a predicted value of B given an input value of A. In this example, testing a model may include inputting each of the ten values of A from the training data set 102, comparing the predicted values of B to the corresponding actual values of B from the training data set 102, and determining if and/or by how much the two predicted and actual values of B differ. To illustrate, if a particular neural network correctly predicted the value of B for nine of the ten rows, then the a relatively simple fitness function 140 may assign the corresponding model a fitness value of 9/10=0.9. It is to be understood that the previous example is for illustration only and is not to be considered limiting. In some aspects, the fitness function 140 may be based on factors unrelated to error frequency or error rate, such as number of input nodes, node layers, hidden layers, connections, computational complexity, etc.

In a particular aspect, fitness evaluation of models may be performed in parallel. To illustrate, the system 100 may include additional devices, processors, cores, and/or threads 190 to those that execute the genetic algorithm 110 and the backpropagation trainer 180. These additional devices, processors, cores, and/or threads 190 may test model fitness in parallel based on the training data set 102 and may provide the resulting fitness values to the genetic algorithm 110.

In a particular aspect, the genetic algorithm 110 may be configured to perform speciation. For example, the genetic algorithm 110 may be configured to cluster (e.g., group) the models of the input set 120 into species based on "genetic distance" between the models. Because each model represents a neural network, the genetic distance between two models may be based on differences in topologies, layers, nodes, activation functions, aggregation functions, connections, connection weights, etc. of the two models. In an illustrative example, the genetic algorithm 110 may be configured to serialize a model into a bit string. In this example, the genetic distance between models may be represented by the number of differing bits in the bit strings corresponding to the models. The bit strings corresponding to models may be referred to as "encodings" of the models. Speciation is further described with reference to FIG. 3.

Because the genetic algorithm 110 is configured to mimic biological evolution and principles of natural selection, it may be possible for a species of models to become "extinct." The stagnation criterion 150 may be used to determine when a species should become extinct, e.g., when the models in the species are to be removed from the genetic algorithm 110. Stagnation is further described with reference to FIG. 4.

The crossover operation 160 and the mutation operation 170 is highly stochastic under certain constraints and a defined set of probabilities optimized for model building, which produces reproduction operations that can be used to generate the output set 130, or at least a portion thereof, from the input set 120. In a particular aspect, the genetic algorithm 110 utilizes intra-species reproduction but not inter-species reproduction in generating the output set 130. Including intra-species reproduction and excluding inter-species reproduction may be based on the assumption that because they share more genetic traits, the models of a species are more likely to cooperate and will therefore more quickly converge on a sufficiently accurate neural network. In some examples, inter-species reproduction may be used in addition to or instead of intra-species reproduction to generate the output set 130. Crossover and mutation are further described with reference to FIG. 6.

Left alone and given time to execute enough epochs, the genetic algorithm 110 may be capable of generating a model (and by extension, a neural network) that meets desired accuracy requirements. However, because genetic algorithms utilize randomized selection, it may be overly time-consuming for a genetic algorithm to arrive at an acceptable neural network. To "help" the genetic algorithm 110 arrive at a solution faster, a model may occasionally be sent from the genetic algorithm 110 to the backpropagation trainer 180 for training. This model is referred to herein as a trainable model 122. In particular, the trainable model 122 may be based on crossing over and/or mutating the fittest models of the input set 120, as further described with reference to FIG. 5. Thus, the trainable model 122 may not merely be a genetically "trained" file produced by the genetic algorithm 110. Rather, the trainable model 122 may represent an advancement with respect to the fittest models of the input set 120.

Like the training data set selection 104, the backpropagation trainer 180 may embody one or more low-power adaptations that enable all or a portion of the components of FIG. 1A to be implemented by a low-power processor or controller. For example, the backpropagation trainer 180 may include weight adjustment 184. The backpropagation trainer 180 may utilize a portion, but not all of the training data set 102 to train the connection weights of the trainable model 122, thereby generating a trained model 182. For example, the portion of the training data set 102 may be input into the trainable model 122, which may in turn generate output data. The training data set 102 and the output data may be used to determine an error value or error measure, and the error value/measure may be used to modify connection weights of the model, such as by using gradient descent or another function.

Backpropagation may typically involve adjusting connection weights any and every time there is a non-zero error value, i.e., output data does not match expected output data. As a low-power adaptation, in some implementations, the weight adjustment 184 includes selectively (rather than always in the case of a non-zero error value) updating connection weights of connections of the trainable model 122. For example, the training data set 102 and the output data may be used to determine node error measures of nodes of the trainable model 122. A node error measure of a particular node may indicate a relative contribution of that node to an overall error. In some examples, only nodes that have node error measures greater than a node error threshold (e.g., a non-zero error threshold) may have connection weights updated. Alternatively, or in addition, connection weights may only be updated if an overall error measure (which may be determined by mathematically aggregating node-specific error measures) is greater than an overall error threshold (e.g., a non-zero error threshold).

The weight adjustment 184 may thus differ from typical backpropagation, which includes updating connection weights of connections associated with all nodes (or at least all nodes that have any contribution to the error value). In some examples, a large number of nodes may make relatively small contributions to the error value. Updating the connection weights of a large number of nodes consumes resources (e.g., time and processing cycles) while having a relatively small impact on improving the error value and thus the model as a whole. In a particular example, a single layer of the trainable model 122 includes multiple nodes. In some such examples, a layer-specific rather than node-specific error measure may be used to determine whether to update connection weights of the nodes in the layer, where the layer-specific error measure is based on mathematically aggregating node error measures of the nodes in the layer and is compared to a layer error threshold (e.g., a non-zero error threshold).

In a particular aspect, error measures are also used to determine a learning rate for the backpropagation trainer 180. To illustrate, the difference between a node/layer/overall error measure and a node/layer/overall error threshold may be used to determine a learning rate, and one or more connection weight that are adjusted may be adjusted by an amount that is based at least in part on the learning rate. In a particular example, a higher difference between the compared error measure and error threshold results in use of a higher learning rate, which in turn corresponds to a larger connection weight adjustment. Selectively updating connection weights for nodes that have a greater contribution to output error can speed up backpropagation by reducing scope of optimization (as compared to updating connection weights of all nodes). Moreover, faster backpropagation leads to lower power consumption.

In some examples, the backpropagation trainer 180 trains using a portion rather than all of the training data set 102 to mitigate overfit concerns and/or to shorten training time. The backpropagation trainer 180 may leave aspects of the trainable model 122 other than connection weights (e.g., neural network topology, activation functions, etc.) unchanged. Backpropagating a portion of the training data set 102 through the trainable model 122 may serve to positively reinforce "genetic traits" of the fittest models in the input set 120 that were used to generate the trainable model 122. In situations where the backpropagation trainer 180 is executed on a different device, processor, core, and/or thread than the genetic algorithm 110, the genetic algorithm 110 may continue executing additional epoch(s) while the connection weights of the trainable model 122 are being trained. When training is complete, the trained model 182 may be input back into (a subsequent epoch of) the genetic algorithm 110, so that the positively reinforced "genetic traits" of the trained model 182 are available to be inherited by other models in the genetic algorithm 110.

In a particular implementation, the backpropagation trainer 180 includes an optimization search 186. The optimization search 186, such as an A*("A-star") search is performed to converge to a model based on a rate of improvement. For example, the backpropagation trainer 180 may retain (e.g., store in a memory) a first trainable model (e.g., the trainable model 122) at a first time. The backpropagation trainer 180 may perform a set of backpropagation iterations. For example, during an initial backpropagation iteration, the backpropagation trainer 180 generates a first trained model by training the first trainable model. The genetic algorithm 110 receives the first trained model as input and eventually outputs a second trainable model. During a second backpropagation iteration, the backpropagation trainer 180 generates a second trained model by training the second trainable model. The backpropagation trainer 180 determines a first improvement based on a comparison of error values corresponding to the first trained model and the second trained model. Similarly, the backpropagation trainer 180 determines a second improvement based on a comparison of error values corresponding to the second trained model and a third trained model (generated during a third backpropagation iteration). The backpropagation trainer 180 determines a rate of improvement associated with the applied set of backpropagation iterations, for example by comparing two or more of the first, second, or third improvement.

By tracking improvements made by backpropagation and storing old trained models, the optimization search 186 is enabled to "revert" to an older trained model if backpropagation is not sufficiently improving model performance. To illustrate, if the second improvement is not at least a threshold amount better than the first improvement, the optimization search 186 may "roll back" backpropagation iterations by reverting to the first trained model (e.g., outputting an older trained model at the end of a backpropagation iteration). In some examples, reverting to an older model includes performing backpropagation on the older model rather than a newly received trainable model. Selectively rolling back the backpropagation iteration(s) based on improvement rate enables the backpropagation trainer 180 to avoid local minima and to avoid weight vectors that are not converging or taking too long to converge.

Further operation of the system 100 in general, and the genetic algorithm 110 in particular, is now described with reference to FIGS. 3-7. It is to be understood, however, that in alternative implementations certain operations may be performed in a different order than described. Moreover, operations described as sequential may be instead be performed at least partially concurrently, and operations described as being performed at least partially concurrently may instead be performed sequentially.

During a configuration stage of operation, a user may specify the input data set 106 and may specify a particular data field or a set of data fields in the input data set 106 to be modeled. The data field(s) to be modeled may correspond to output nodes of a neural network that is to be generated by the system 100. For example, if a user indicates that the value of a particular data field is to be modeled (e.g., to predict the value based on other data of the data set), the model may be generated by the system 100 to include an output node that generates an output value corresponding to a modeled value of the particular data field. In particular implementations, the user can also configure other aspects of the model. For example, the user may provide input to indicate a particular data field of the data set that is to be included in the model or a particular data field of the data set that is to be omitted from the model. As another example, the user may provide input to constrain allowed model topologies. To illustrate, the model may be constrained to include no more than a specified number of input nodes, no more than a specified number of hidden layers, or no recurrent loops.

Further, in particular implementations, the user can configure aspects of the genetic algorithm 110. For example, the user may provide input to limit a number of epochs that will be executed by the genetic algorithm 110. Alternatively, the user may specify a time limit indicating an amount of time that the genetic algorithm 110 has to generate the model, and the genetic algorithm 110 may determine a number of epochs that will be executed based on the specified time limit. To illustrate, an initial epoch of the genetic algorithm 110 may be timed (e.g., using a hardware or software timer at the computing device executing the genetic algorithm 110), and a total number of epochs that are to be executed within the specified time limit may be determined accordingly. As another example, the user may constrain a number of models evaluated in each epoch, for example by constraining the size of the input set 120 and/or the output set 130. As yet another example, the user can define a number of trainable models 122 to be trained by the backpropagation trainer 180 and fed back into the genetic algorithm 110 as trained models 182. The user can configure various thresholds and default values, described herein.

In particular aspects, configuration of the genetic algorithm 110 also includes performing pre-processing steps based on the input data set 106. For example, the system 100 may determine, based on the input data set 106 and/or user input, whether a neural network is to be generated for a regression problem, a classification problem, a reinforcement learning problem, etc. As another example, the input data set 106 may be "cleaned" to remove obvious errors, fill in data "blanks," etc. As another example, values in the input data set 106 may be scaled (e.g., to values between 0 and 1). As yet another example, non-numerical data (e.g., categorical classification data or Boolean data) may be converted into numerical data. In particular aspects, the pre-processing steps include performing the training data set selection 104 to select the training data set 102 from the input data set 106. In a particular aspect, the input data set 106 is unavailable during the configuration stage. In this aspect, at least a portion of the input data set 106 is generated and processed in real-time or near-real-time.

After the above-described configuration stage, the genetic algorithm 110 may automatically generate an initial set of models based on the training data set 102, received user input indicating (or usable to determine) the type of problem to be solved, etc. (e.g., the initial set of models is data-driven). As illustrated in FIG. 2, each model may be specified by at least a neural network topology, an activation function, and link weights. The neural network topology may indicate an arrangement of nodes (e.g., neurons). For example, the neural network topology may indicate a number of input nodes, a number of hidden layers, a number of nodes per hidden layer, and a number of output nodes. The neural network topology may also indicate the interconnections (e.g., axons or links) between nodes.

The initial set of models may be input into an initial epoch of the genetic algorithm 110 as the input set 120, and at the end of the initial epoch, the output set 130 generated during the initial epoch may become the input set 120 of the next epoch of the genetic algorithm 110. In some examples, the input set 120 may have a specific number of models. For example, as shown in a first stage 300 of operation in FIG. 3, the input set may include 200 models. It is to be understood that alternative examples may include a different number of models in the input set 120 and/or the output set 130.

For the initial epoch of the genetic algorithm 110, the topologies of the models in the input set 120 may be randomly or pseudo-randomly generated within constraints specified by any previously input configuration settings. Accordingly, the input set 120 may include models with multiple distinct topologies. For example, a first model may have a first topology, including a first number of input nodes associated with a first set of data parameters, a first number of hidden layers including a first number and arrangement of hidden nodes, one or more output nodes, and a first set of interconnections between the nodes. In this example, a second model of epoch may have a second topology, including a second number of input nodes associated with a second set of data parameters, a second number of hidden layers including a second number and arrangement of hidden nodes, one or more output nodes, and a second set of interconnections between the nodes. Since the first model and the second model are both attempting to model the same data field(s), the first and second models have the same output nodes.

The genetic algorithm 110 may automatically assign an activation function, an aggregation function, a bias, connection weights, etc. to each model of the input set 120 for the initial epoch. In some aspects, the connection weights are assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes of a model may have different types of activation functions. In other implementations, the activation function assigned to each node may be randomly or pseudo-randomly selected (from the set of allowed activation functions) for each node of the particular model. Aggregation functions may similarly be randomly or pseudo-randomly assigned for the models in the input set 120 of the initial epoch. Thus, the models of the input set 120 of the initial epoch may have different topologies (which may include different input nodes corresponding to different input data fields if the data set includes many data fields) and different connection weights. Further, the models of the input set 120 of the initial epoch may include nodes having different activation functions, aggregation functions, and/or bias values/functions.

Continuing to a second stage 350 of operation, each model of the input set 120 may be tested based on the training data set 102 to determine model fitness. For example, the training data set 102 may be provided as input data to each model, which processes the training data set (according to the network topology, connection weights, activation function, etc., of the respective model) to generate output data. The output data of each model may be evaluated using the fitness function 140 to determine how well the model modeled the training data set 102. For example, in the case of a regression problem, the output data may be evaluated by comparing a prediction value in the output data to an actual value in the training data set 102. As another example, in the case of a classification problem, a classifier result indicated by the output data may be compared to a classification associated with the training data set 102 to determine if the classifier result matches the classification in the training data set 102. As yet another example, in the case of a reinforcement learning problem, a reward may be determined (e.g., calculated) based on evaluation of an environment, which may include one or more variables, functions, etc. In a reinforcement learning problem, the fitness function 140 may be the same as or may be based on the reward function(s). Fitness of a model may be evaluated based on performance (e.g., accuracy) of the model, complexity (or sparsity) of the model, or a combination thereof. As a simple example, in the case of a regression problem or reinforcement learning problem, a fitness value may be assigned to a particular model based on an error value associated with the output data of that model or based on the value of the reward function, respectively. As another example, in the case of a classification problem, the fitness value may be assigned based on whether a classification determined by a particular model is a correct classification, or how many correct or incorrect classifications were determined by the model.

In a more complex example, the fitness value may be assigned to a particular model based on both prediction/classification accuracy or reward optimization as well as complexity (or sparsity) of the model. As an illustrative example, a first model may model the data set well (e.g., may generate output data or an output classification with a relatively small error, or may generate a large positive reward function value) using five input nodes (corresponding to five input data fields), whereas a second potential model may also model the data set well using two input nodes (corresponding to two input data fields). In this illustrative example, the second model may be sparser (depending on the configuration of hidden nodes of each network model) and therefore may be assigned a higher fitness value than the first model.

Figure 3:
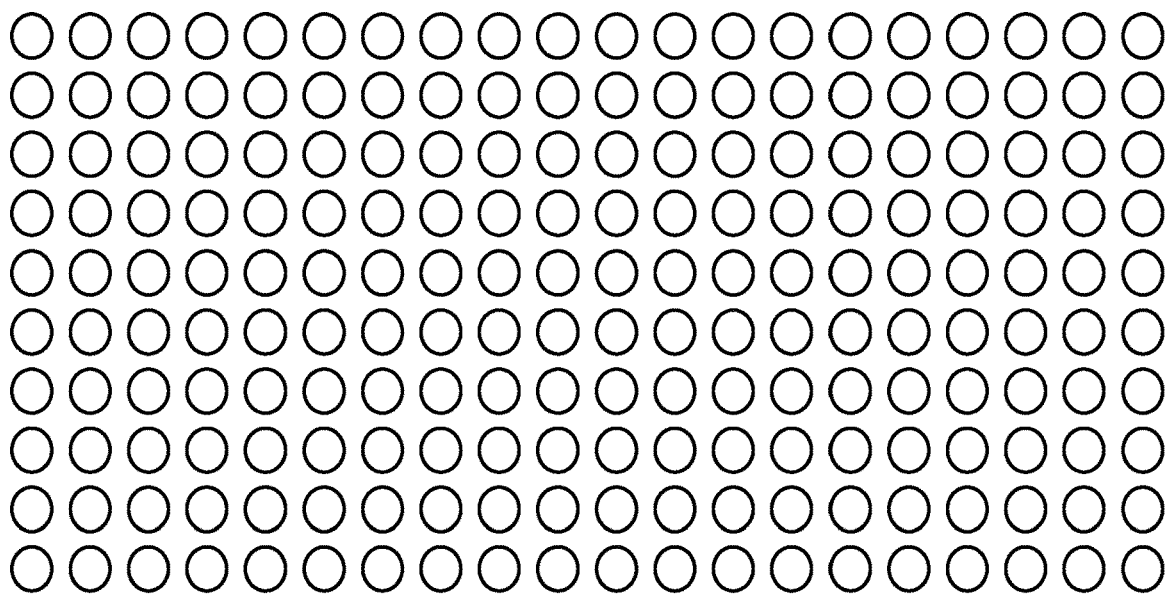
FIG. 3 illustrates particular examples of first and second stages of operation at the system of FIG. 1.
Figure 3:
Figure 3:
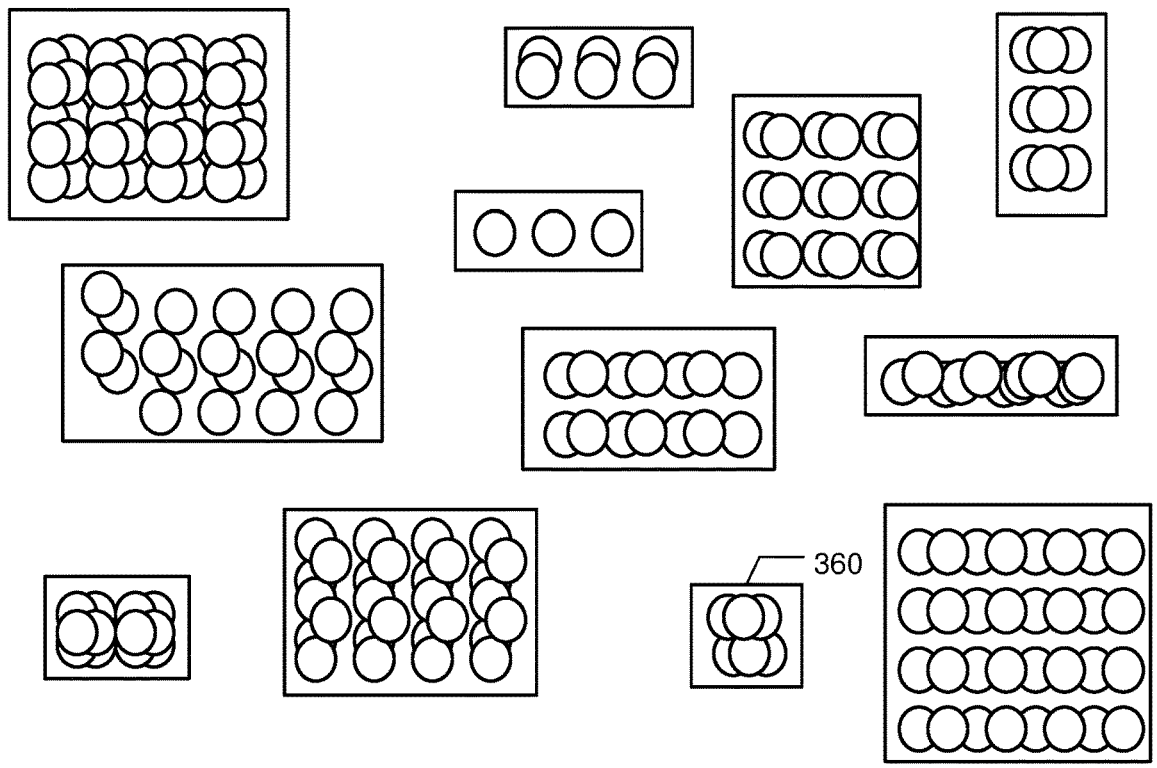

As shown in FIG. 3, the second stage 350 may include clustering the models into species based on genetic distance. In a particular aspect, the species ID 230 of each of the models may be set to a value corresponding to the species that the model has been clustered into.

Figure 4:
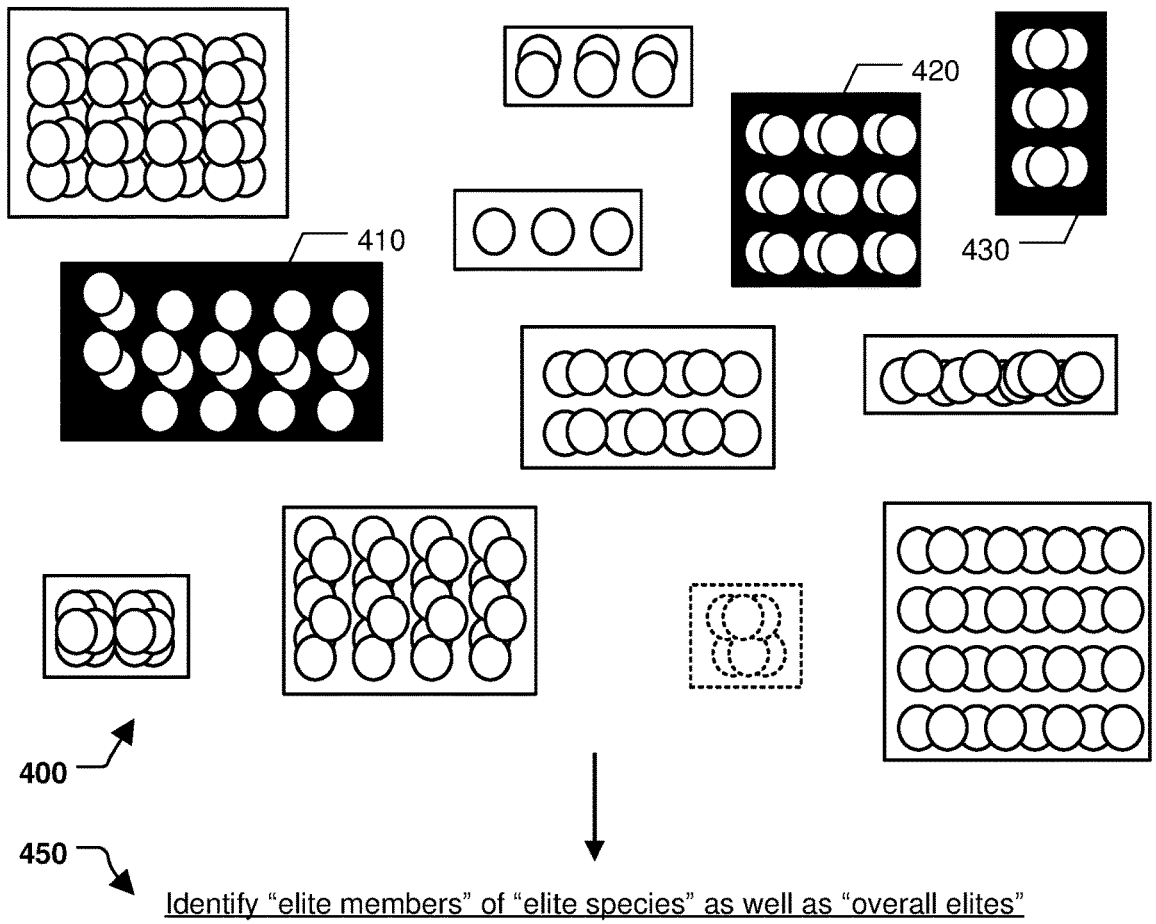
FIG. 4 illustrates particular examples of third and fourth stages of operation at the system of FIG. 1.
Figure 4:
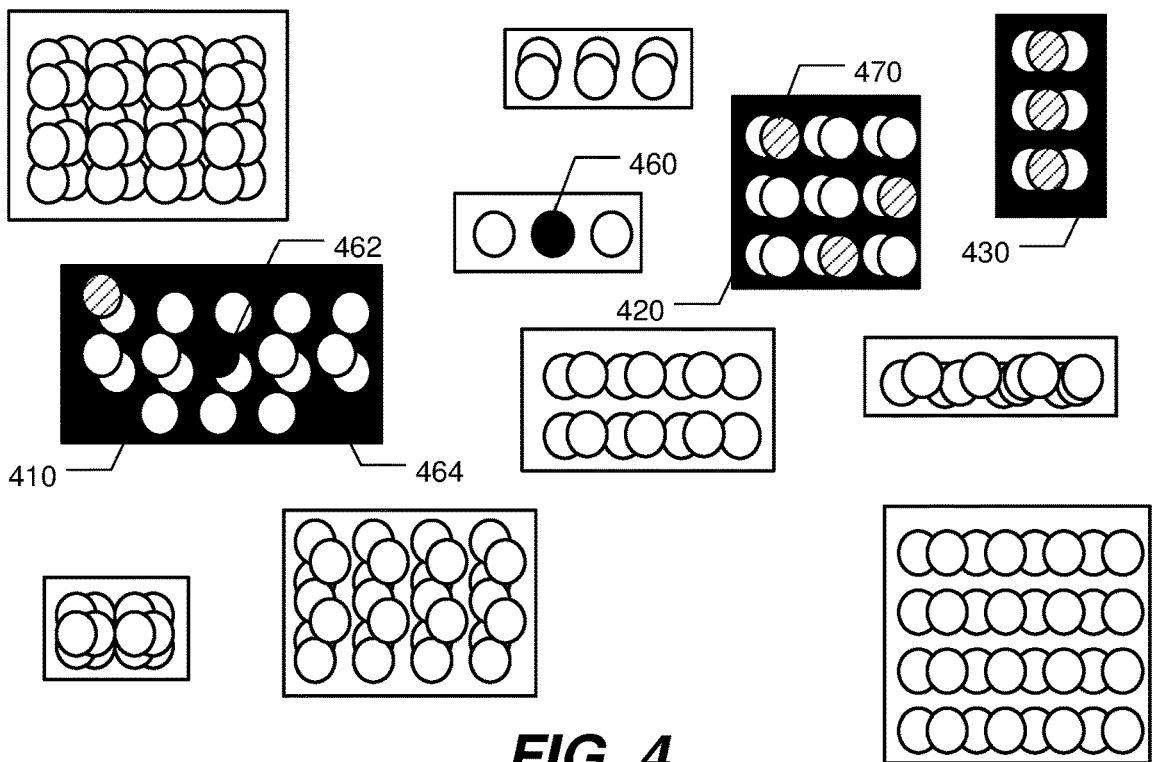

Continuing to FIG. 4, during a third stage 400 and a fourth stage 450 of operation, a species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 110 may maintain a data structure that tracks the fitness of each species across multiple epochs. Based on the species fitness, the genetic algorithm 110 may identify the "fittest" species, shaded and denoted in FIG. 4 as "elite species." Although three elite species 410, 420, and 430 are shown in FIG. 4, it is to be understood that in alternate examples a different number of elite species may be identified.

In a particular aspect, the genetic algorithm 110 uses species fitness to determine if a species has become stagnant and is therefore to become extinct. As an illustrative non-limiting example, the stagnation criterion 150 may indicate that a species has become stagnant if the fitness of that species remains within a particular range (e.g., +/−5%) for a particular number (e.g., 5) epochs. If a species satisfies a stagnation criteria, the species and all underlying models may be removed from the genetic algorithm 110. In the illustrated example, species 360 of FIG. 3 is removed, as shown in the third stage 400 through the use of broken lines.

Proceeding to the fourth stage 450, the fittest models of each "elite species" may be identified. The fittest models overall may also be identified. In the illustrated example, the three fittest models of each "elite species" are denoted "elite members" and shown using a hatch pattern. Thus, model 470 is an "elite member" of the "elite species" 420. The three fittest models overall are denoted "overall elites" and are shown using black circles. Thus, models 460, 462, and 464 are the "overall elites" in the illustrated example. As shown in FIG. 4 with respect to the model 460, an "overall elite" need not be an "elite member," e.g., may come from a non-elite species. In an alternate implementation, a different number of "elite members" per species and/or a different number of "overall elites" may be identified.

Figure 5:
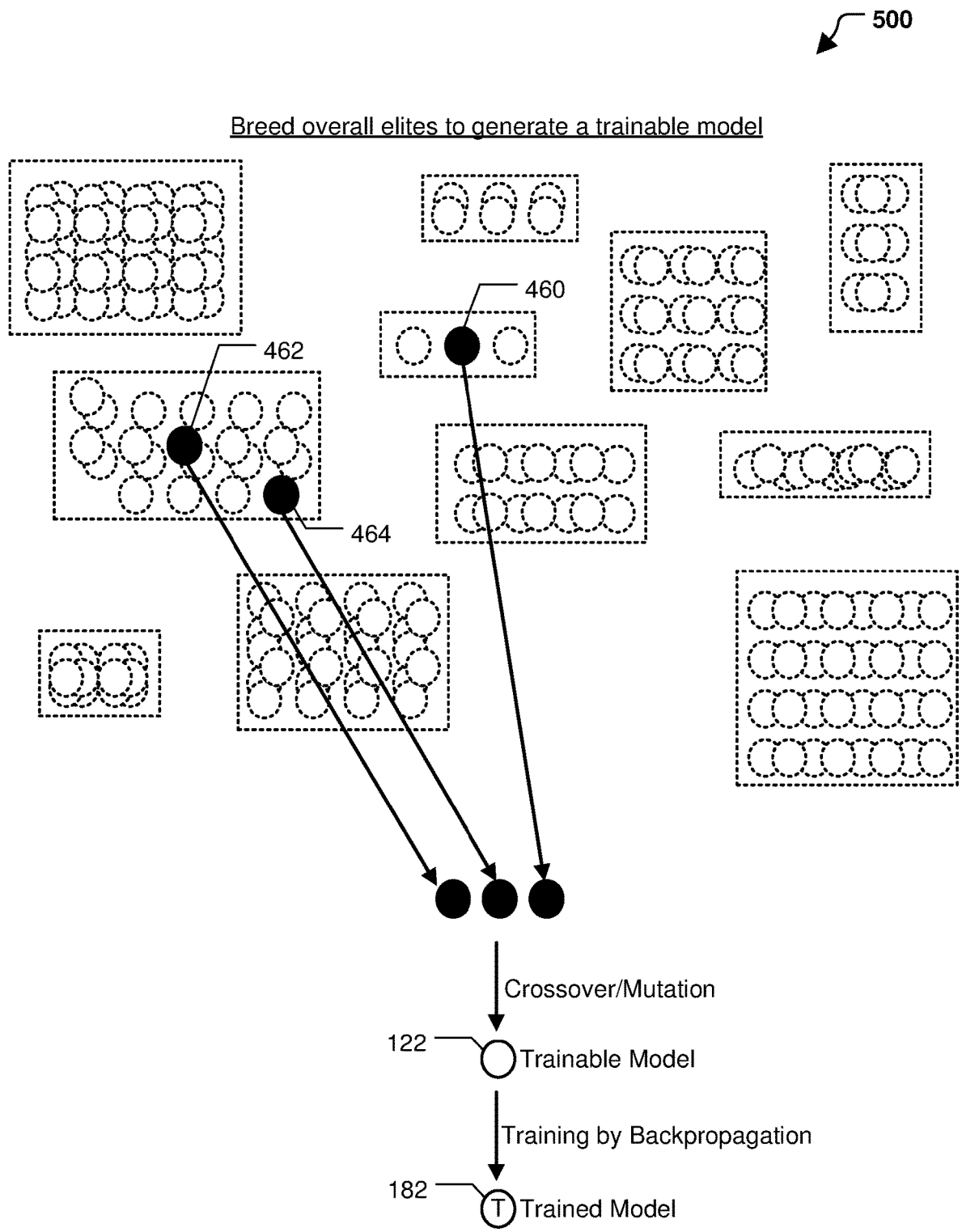
FIG. 5 illustrates a particular example of a fifth stage of operation at the system of FIG. 1.

Referring now to FIG. 5, during a fifth stage 500 of operation, the "overall elite" models 460, 462, and 464 may be genetically combined to generate the trainable model 122. For example, genetically combining models may include crossover operations in which a portion of one model is added to a portion of another model, as further illustrated in FIG. 6. As another example, a random mutation may be performed on a portion of one or more of the "overall elite" models 460, 462, 464 and/or the trainable model 122. The trainable model 122 may be sent to the backpropagation trainer 180, as described with reference to FIG. 1A. The backpropagation trainer 180 may perform weight adjustment 184 to train connection weights of the trainable model 122 based on a portion of the training data set 102. In a particular aspect, the backpropagation trainer 180 may perform the optimization search 186 by determining an improvement rate and selectively reverting to a previous trainable model (e.g., generated during a previous epoch) if the improvement rate is low. In this aspect, the backpropagation trainer 180 may generate the trained model 182 by training the previous trainable model. When training is complete, the resulting trained model 182 may be received from the backpropagation trainer 180 and may be input into a subsequent epoch of the genetic algorithm 110.

Figure 6:
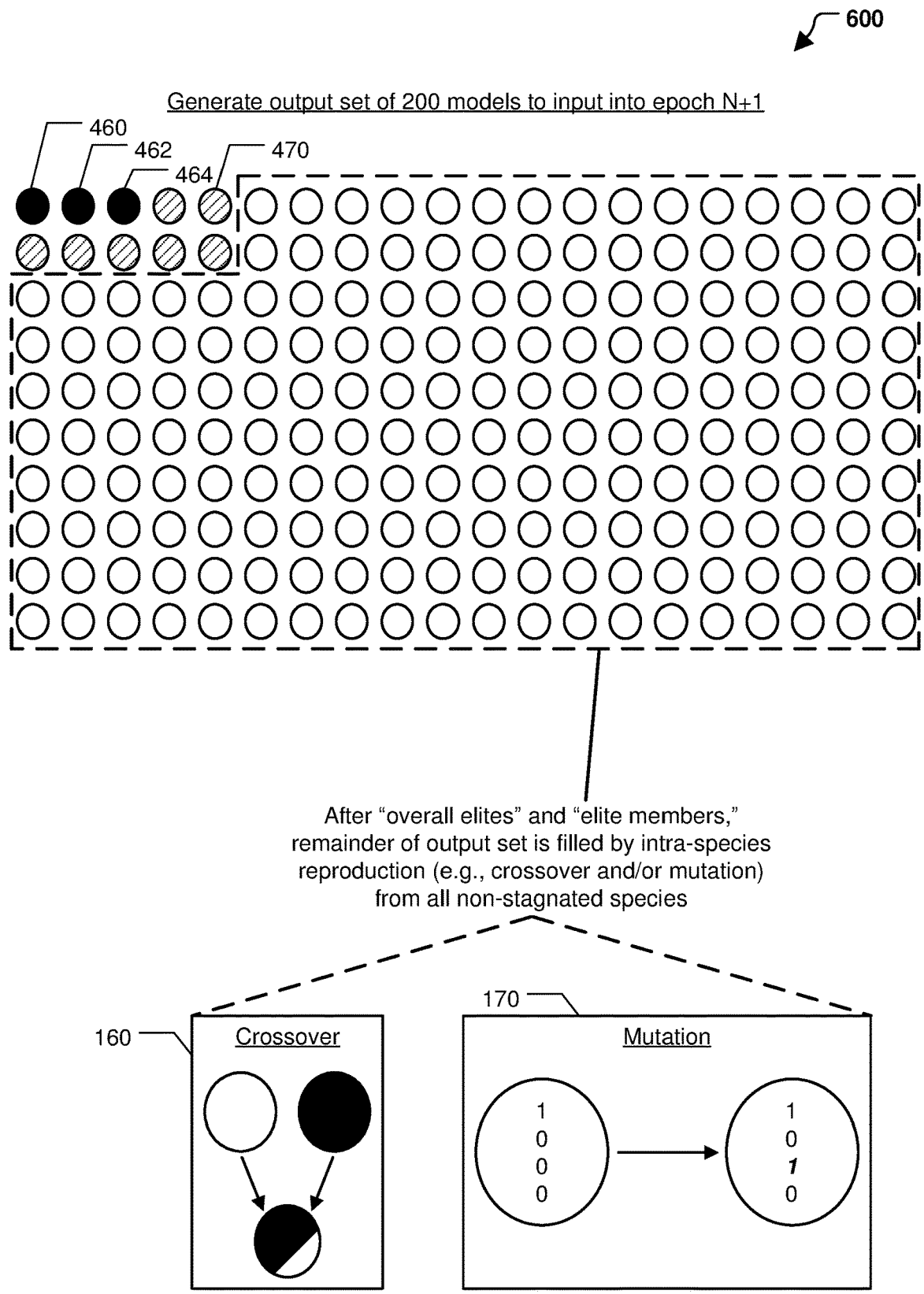
FIG. 6 illustrates a particular example of a sixth stage of operation at the system of FIG. 1.

Continuing to FIG. 6, while the backpropagation trainer 180 trains the trainable model 182, the output set 130 of the epoch may be generated in a sixth stage 600 of operation. In the illustrated example, the output set 130 includes the same number of models, e.g., 200 models, as the input set 120. The output set 130 may include each of the "overall elite" models 460-464. The output set 130 may also include each of the "elite member" models, including the model 470. Propagating the "overall elite" and "elite member" models to the next epoch may preserve the "genetic traits" resulted in caused such models being assigned high fitness values.

The rest of the output set 130 may be filled out by random intra-species reproduction using the crossover operation 160 and/or the mutation operation 170. In the illustrated example, the output set 130 includes 10 "overall elite" and "elite member" models, so the remaining 190 models may be randomly generated based on intra-species reproduction using the crossover operation 160 and/or the mutation operation 170. After the output set 130 is generated, the output set 130 may be provided as the input set 120 for the next epoch of the genetic algorithm 110.

During the crossover operation 160, a portion of one model may be combined with a portion of another model, where the size of the respective portions may or may not be equal. To illustrate with reference to the model "encodings"

described with respect to FIG. 1A, the crossover operation 160 may include concatenating bits 0 to p of one bit string with bits p+1 to q of another bit string, where p and q are integers and p+q is equal to the total size of a bit string that represents a model resulting from the crossover operation 160. When decoded, the resulting bit string after the crossover operation 160 produces a neural network that differs from each of its "parent" neural networks in terms of topology, activation function, aggregation function, bias value/function, link weight, or any combination thereof.

Thus, the crossover operation 160 may be a random or pseudo-random biological operator that generates a model of the output set 130 by combining aspects of a first model of the input set 120 with aspects of one or more other models of the input set 120. For example, the crossover operation 160 may retain a topology of hidden nodes of a first model of the input set 120 but connect input nodes of a second model of the input set to the hidden nodes. As another example, the crossover operation 160 may retain the topology of the first model of the input set 120 but use one or more activation functions of the second model of the input set 120. In some aspects, rather than operating on models of the input set 120, the crossover operation 160 may be performed on a model (or models) generated by mutation of one or more models of the input set 120. For example, the mutation operation 170 may be performed on a first model of the input set 120 to generate an intermediate model and the crossover operation 160 may be performed to combine aspects of the intermediate model with aspects of a second model of the input set 120 to generate a model of the output set 130.

During the mutation operation 170, a portion of a model may be randomly modified. The frequency of mutations may be based on a mutation probability metric, which may be user-defined or randomly selected/adjusted. To illustrate with reference to the model "encodings" described with respect to FIG. 1A, the mutation operation 170 may include randomly "flipping" one or more bits of a bit string.

The mutation operation 170 may thus be a random or pseudo-random biological operator that generates or contributes to a model of the output set 130 by mutating any aspect of a model of the input set 120. For example, the mutation operation 170 may cause the topology of a particular model of the input set to be modified by addition or omission of one or more input nodes, by addition or omission of one or more connections, by addition or omission of one or more hidden nodes, or a combination thereof. As another example, the mutation operation 170 may cause one or more activation functions, aggregation functions, bias values/functions, and/or or connection weights to be modified. In some aspects, rather than operating on a model of the input set, the mutation operation 170 may be performed on a model generated by the crossover operation 160. For example, the crossover operation 160 may combine aspects of two models of the input set 120 to generate an intermediate model and the mutation operation 170 may be performed on the intermediate model to generate a model of the output set 130.

The genetic algorithm 110 may continue in the manner described above through multiple epochs. When the genetic algorithm 110 receives the trained model 182, the trained model 182 may be provided as part of the input set 120 of the next epoch, as shown in a seventh stage 700 of FIG. 7. For example, the trained model 182 may replace one of the other 200 models in the input set 120 or may be a $201^{st}$ model of the input set (e.g., in some epochs, more than 200 models may be processed). During training by the backpropagation trainer 180, the genetic algorithm 110 may have advanced one or more epochs. Thus, when the trained model 182 is received, the trained model 182 may be inserted as input into an epoch subsequent to the epoch during which the corresponding trainable model 122 was provided to the backpropagation trainer 180. To illustrate, if the trainable model 122 was provided to the backpropagation trainer 180 during epoch N, then the trained model 182 may be input into epoch N+X, where X is an integer greater than zero.

Figure 7:
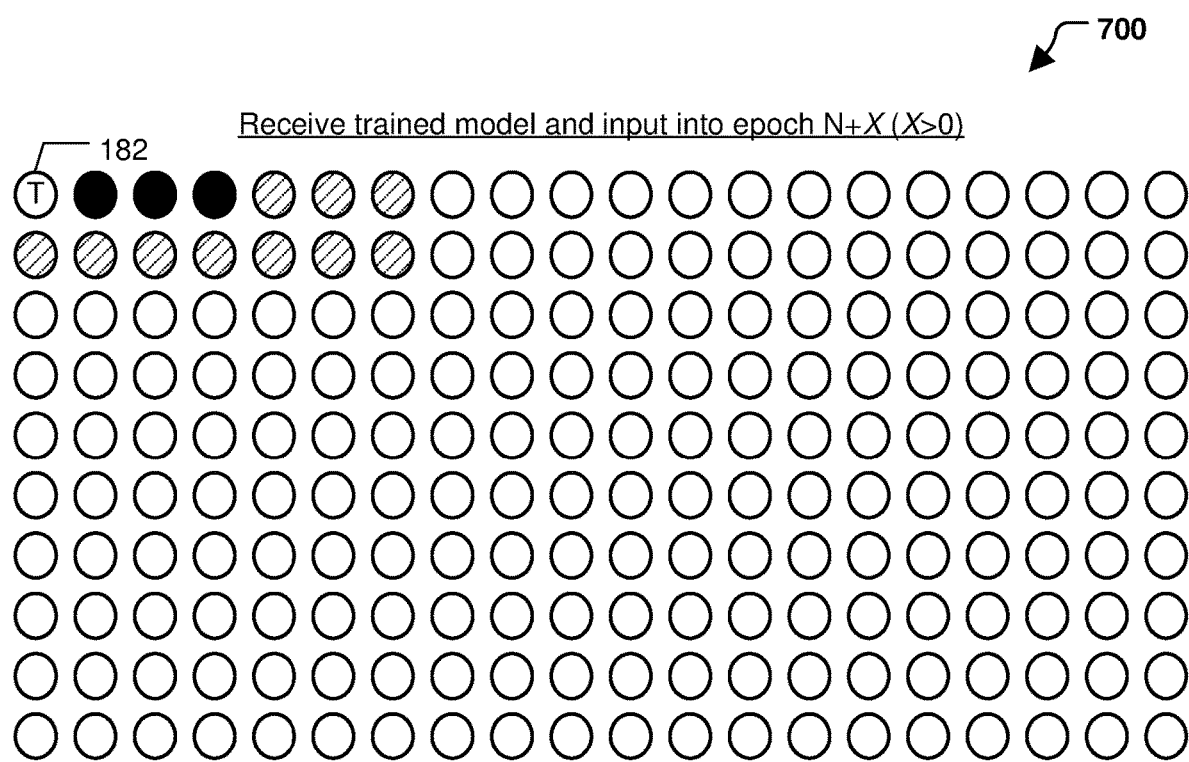
FIG. 7 illustrates a particular example of a seventh stage of operation at the system of FIG. 1.

In the example of FIGS. 5 and 7, a single trainable model 122 is provided to the backpropagation trainer 180 and a single trained model 182 is received from the backpropagation trainer 180. When the trained model 182 is received, the backpropagation trainer 180 becomes available to train another trainable model. Thus, because training takes more than one epoch, trained models 182 may be input into the genetic algorithm 110 sporadically rather than every epoch after the initial epoch. In some implementations, the backpropagation trainer 180 may have a queue or stack of trainable models 122 that are awaiting training. The genetic algorithm 110 may add trainable models 122 to the queue or stack as they are generated and the backpropagation trainer 180 may remove a trainable model 122 from the queue or stack at the start of a training cycle. In some implementations, the system 100 includes multiple backpropagation trainers 180 (e.g., executing on different devices, processors, cores, or threads). Each of the backpropagation trainers 180 may be configured to simultaneously train a different trainable model 122 to generate a different trained model 182. In such examples, more than one trainable model 122 may be generated during an epoch and/or more than one trained model 182 may be input into an epoch.

Operation at the system 100 may continue iteratively until specified a termination criterion, such as a time limit, a number of epochs, or a threshold fitness value (of an overall fittest model) is satisfied. When the termination criterion is satisfied, an overall fittest model of the last executed epoch may be selected and output as representing a neural network that best models the training data set 102. In some examples, the overall fittest model may undergo a final training operation (e.g., by the backpropagation trainer 180) before being output.

Although various aspects are described with reference to a backpropagation training, it is to be understood that in alternate implementations different types of training may also be used in the system 100. For example, models may be trained using a genetic algorithm training process. In this example, genetic operations similar to those described above are performed while all aspects of a model, except for the connection weight, are held constant.

Performing genetic operations may be less resource intensive than evaluating fitness of models and training of models using backpropagation. For example, both evaluating the fitness of a model and training a model include providing the training data set 102, or at least a portion thereof, to the model, calculating results of nodes and connections of a neural network to generate output data, and comparing the output data to the training data set 102 to determine the presence and/or magnitude of an error. In contrast, genetic operations do not operate on the training data set 102, but rather merely modify characteristics of one or more models. However, as described above, one iteration of the genetic algorithm 110 may include both genetic operations and evaluating the fitness of every model and species. Training trainable models generated by breeding the fittest models of an epoch may improve fitness of the trained models without requiring training of every model of an epoch. Further, the fitness of models of subsequent epochs may benefit from the improved fitness of the trained models due to genetic operations based on the trained models. Accordingly, training the fittest models enables generating a model with a particular error rate in fewer epochs than using genetic operations alone. As a result, fewer processing resources may be utilized in building highly accurate models based on a specified training data set 102.

The system 100 of FIG. 1A may thus support cooperative, data-driven execution of a genetic algorithm and a backpropagation trainer on a low-power controller to automatically arrive at an output neural network model of an input data set. The system of FIG. 1A may arrive at the output neural network model faster than using a genetic algorithm or backpropagation alone and with reduced cost as compared to hiring a data scientist. In some cases, the neural network model output by the system 100 may also be more accurate than a model that would be generated by a genetic algorithm or backpropagation alone. The system 100 may also provide a problem-agnostic ability to generate neural networks. For example, the system 100 may represent a single automated model building framework that is capable of generating neural networks for at least regression problems, classification problems, and reinforcement learning problems. Further, the system 100 may enable generation of a generalized neural network that demonstrates improved adaptability to never-before-seen conditions. To illustrate, the neural network may mitigate or avoid overfitting to an input data set and instead may be more universal in nature. Thus, the neural networks generated by the system 100 may be capable of being deployed with fewer concerns about generating incorrect predictions.

It will be appreciated that the systems and methods of the present disclosure may be applicable in various scenarios, infrastructures, and data environments. As an illustrative non-limiting example, the input data set 106 may include timestamped data from a large array of sensors distributed around a wind farm and may also include timestamped uptime/downtime data of individual wind turbines. The system 100 may generate a neural network model that is configured to predict how likely a wind turbine is to fail. The neural network model may, in a particular example, increase failure lead time from 3-5 days to 30-40 days, which can result in reduced downtime and monetary savings for an operator of the wind farm. The system 100 may be capable of automatically building similar kinds of models that predict numerical values or states (e.g., failures) for internet of things (IoT), utilities, and oil/gas infrastructures.

As another illustrative non-limiting example, the input data set 106 may include health data and the system 100 may automatically build a model to predict whether a patient exhibiting certain health conditions is likely to have a particular ailment. As another illustrative non-limiting example, the input data set 106 may include financial data and the system 100 may automatically build a model to forecast market conditions. As another illustrative non-limiting example, the input data set 106 may include network security, network log, and/or malware data, and the system 100 may automatically build a model to implement firewall filtering rules, endpoint anti-malware detection, a bot/botnet detector, etc.

As another illustrative non-limiting example, the system 100 may generate a neural network to output aircraft autopilot operations (e.g. throttle, steer, flaps, etc.) based on reinforcement learning. In such an example, the reward function optimized by the neural network may involve aircraft altitude, aircraft distance traveled, etc. As yet another example, the system 100 may generate a neural network to predict oil/gas industry workover events (e.g., events that lead to major maintenance or remedial operations on a rig or well, which can lead to considerable production time lost and expense incurred).

Yet another example of a problem set that can be solved with neural networks generated with the system described herein is data fusion. In this case, data aggregated from a large number of sensors of various types, including multiple sensors of the same type, is collected and used to identify an object, action or phenomenon that would not be detectable with any one sensor or a small subset of sensors. For example, the detection of a submarine may be performed based on the inputs received from multiple sonar buoys which provide input to the generated neural network. Another example may be the identification of a particular type of aircraft based on both the audio signature and a visual view (which may be partially obscured, or low resolution).

Figure 8A:
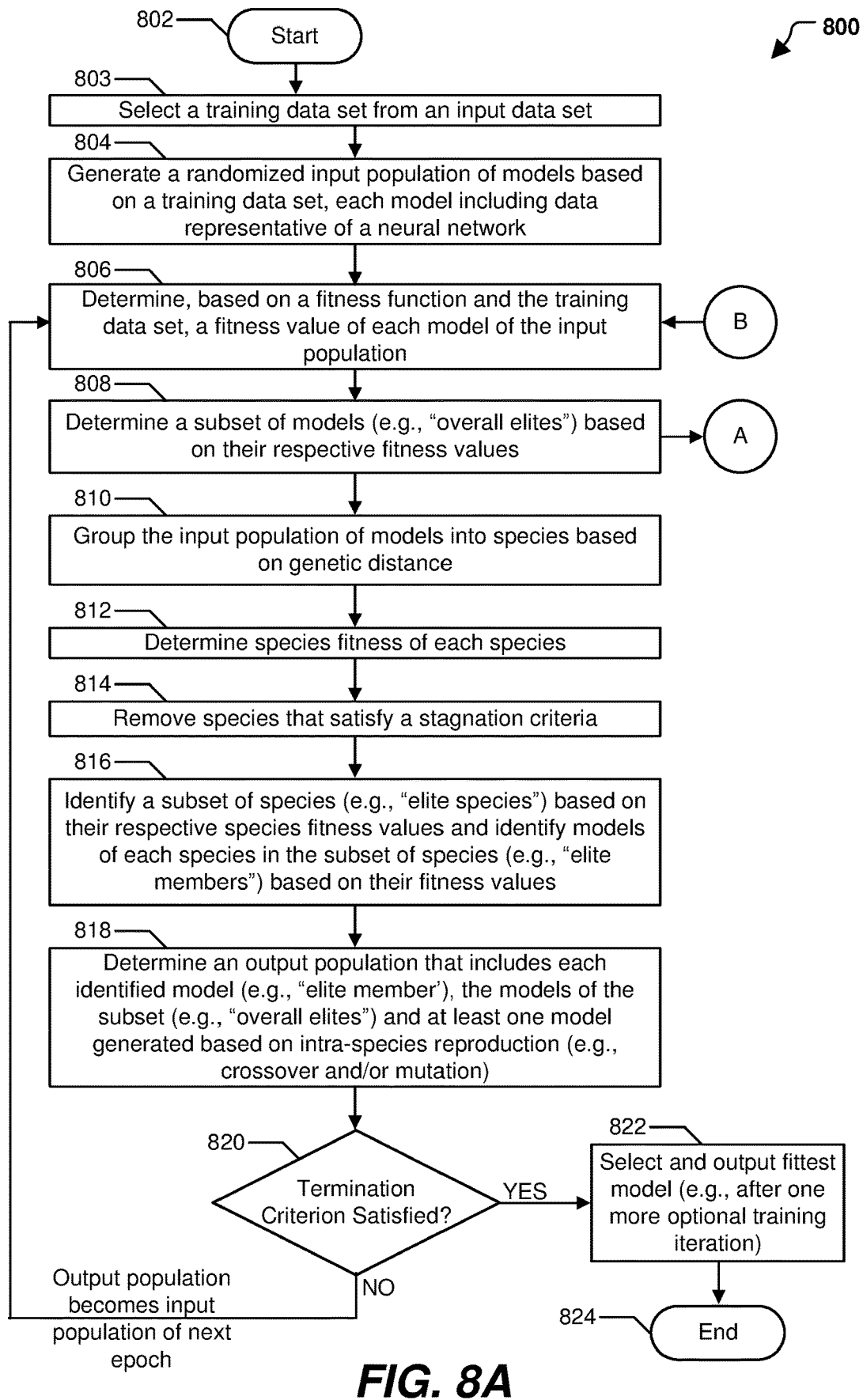
FIGS. 8A and 8B collectively illustrate a particular example of a method of execution of a genetic algorithm on a low-power controller.
Figure 8B:
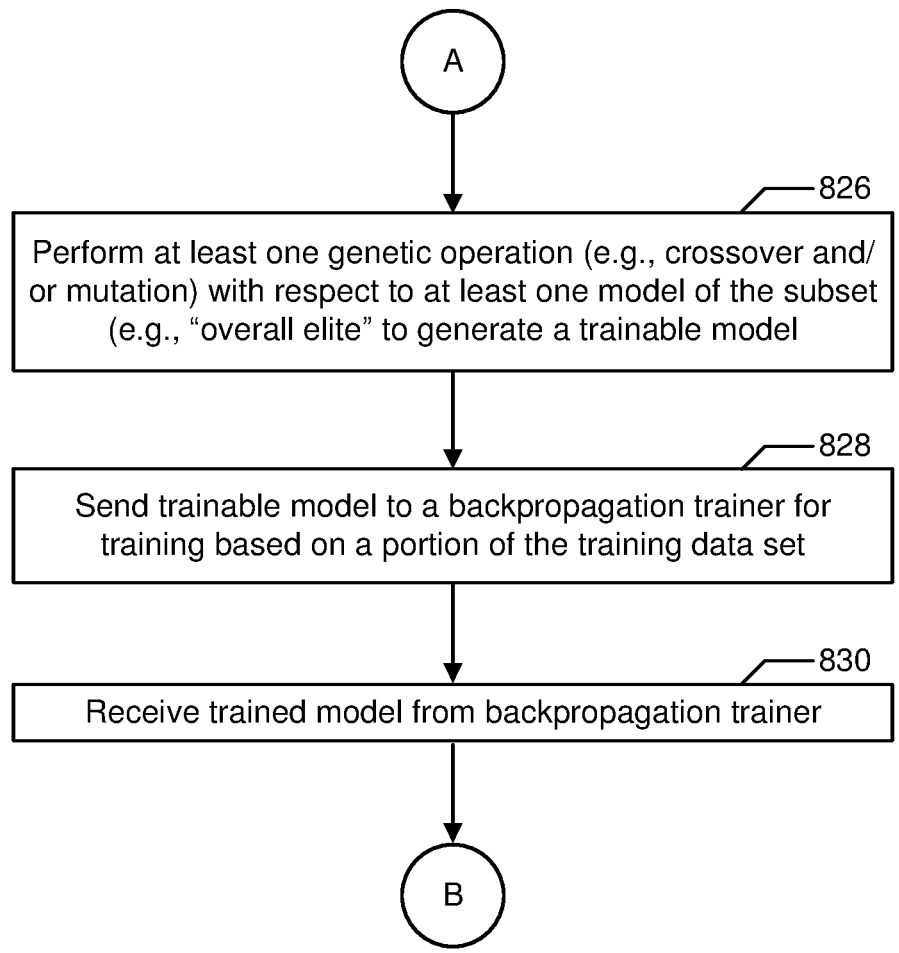

FIGS. 8A and 8B depict a particular example of a method 800 of execution of a genetic algorithm on a low-power controller. In an illustrative example, the method 800 may be performed at the system 100 of FIG. 1A, the system 100 of FIG. 1B, or both.

The method 800 may start, at 802, and may include selecting a training data set from an input data set, at 803. For example, the training data set 102 is selected from the input data set 106, as described with reference to FIG. 1A.

The method 800 may include generating a randomized input population of models based on a training data set, at 804. Each model may include data representative of a neural network. For example, each model may include at least node data and connection data, as described with reference to FIGS. 1A and 2. Further, each of the models may be part of the input set 120 of FIG. 1A and may model the training data set 102 of FIG. 1A.

The method 800 may also include determining, based on a fitness function and the training data set, a fitness value of each model of the input population, at 806. For example, the fitness of each model of the input set 120 may be determined, as described with reference to FIGS. 1A and 3.

The method 800 may further include determining a subset of models based on their respective fitness values, at 808. The subset of models may be the fittest models of the input population, e.g., "overall elites." For example, "overall elites" may be determined as described with reference to FIGS. 1A and 4.

The method 800 may include performing multiple sets of operations at least partially concurrently. Continuing to 826 (in FIG. 8B), the method 800 may include performing at least one genetic operation with respect to at least one model of the subset to generate a trainable model. For example, the crossover operation 160 and/or the mutation operation 170 may be performed with respect to the "overall elites" to generate the trainable model 122, as described with reference to FIGS. 1A, 4, and 5.

The method 800 may also include sending the trainable model to a backpropagation trainer (or other optimization trainer) for training based on a portion of the training data set, at 828. For example, the backpropagation trainer 180 of FIG. 1A may train the trainable model 122 based on a portion of the training data set 102 to generate the trained model 182, as described with reference to FIGS. 1A and 5. To illustrate, the backpropagation trainer 180 may perform the weight adjustment 184, the optimization search 186 of FIG. 1A, or both.

The genetic algorithm may continue while backpropagation training occurs. For example, the method 800 may include grouping the input population of models into species based on genetic distance, at 810, and determining species fitness of each species, at 812 of FIG. 8A. To illustrate, the models of the input set 120 may be grouped into species and species fitness may be evaluated as described with reference to FIGS. 1A, 3, and 4.

Continuing to 814, species that satisfy a stagnation criterion may be removed. For example, species satisfying the stagnation criterion 150 may be removed, as described with reference to FIGS. 1A and 4. At 816, the method 800 may include identifying a subset of species based on their respective fitness values and identifying models of each species in the subset based on their respective model fitness values. The subset of species may be the fittest species of the input population, e.g., "elite species," and the identified models of the "elite species" may be the fittest members of those species, e.g., "elite members." For example, species fitness values, "elite species," and "elite members" may be determined as described with reference to FIGS. 1A and 4.

The method 800 may include determining an output population that includes each "elite member," the "overall elites," and at least one model that is generated based on intra-species reproduction, at 818. For example, the models of the output set 130 of FIG. 1A may be determined, where the output set 130 includes the overall elite models 460-464, the elite members (including the elite member model 470), and at least one model generated based on intra-species reproduction using the crossover operation 160 and/or the mutation operation 170, as described with reference to FIGS. 1A and 6.

The method 800 may include determining whether a termination criterion is satisfied, at 820. The termination criterion may include a time limit, a number of epochs, or a threshold fitness value of an overall fittest model, as illustrative non-limiting examples. If the termination criterion is not satisfied, the method 800 returns to 806 and a next epoch of the genetic algorithm is executed, where the output population determined at 818 is the input population of the next epoch.

As described above, while the genetic algorithm is ongoing, the backpropagation trainer may train the trainable model to generate a trained model. When training is complete, the method 800 may include receiving the trained model from the backpropagation trainer (or other optimization trainer), at 830 (in FIG. 8B). The trained model may be added to the input set of an epoch of the genetic algorithm, as shown in FIG. 8B.

When the termination criterion is satisfied, at 820, the method 800 may include selecting and outputting a fittest model, at 822, and the method 800 may end, at 824. In some implementations, the selected model may be subjected to a final training operation, e.g., by the backpropagation trainer or by another trainer, before being output.

It is to be understood that the division and ordering of steps in FIGS. 8A and 8B is for illustrative purposes only and is not to be considered limiting. In alternative implementations, certain steps may be combined and other steps may be subdivided into multiple steps. Moreover, the ordering of steps may change. For example, the termination criterion may be evaluated after determining the "overall elites," at 808, rather than after determining the output population, at 818.

Figure 9:
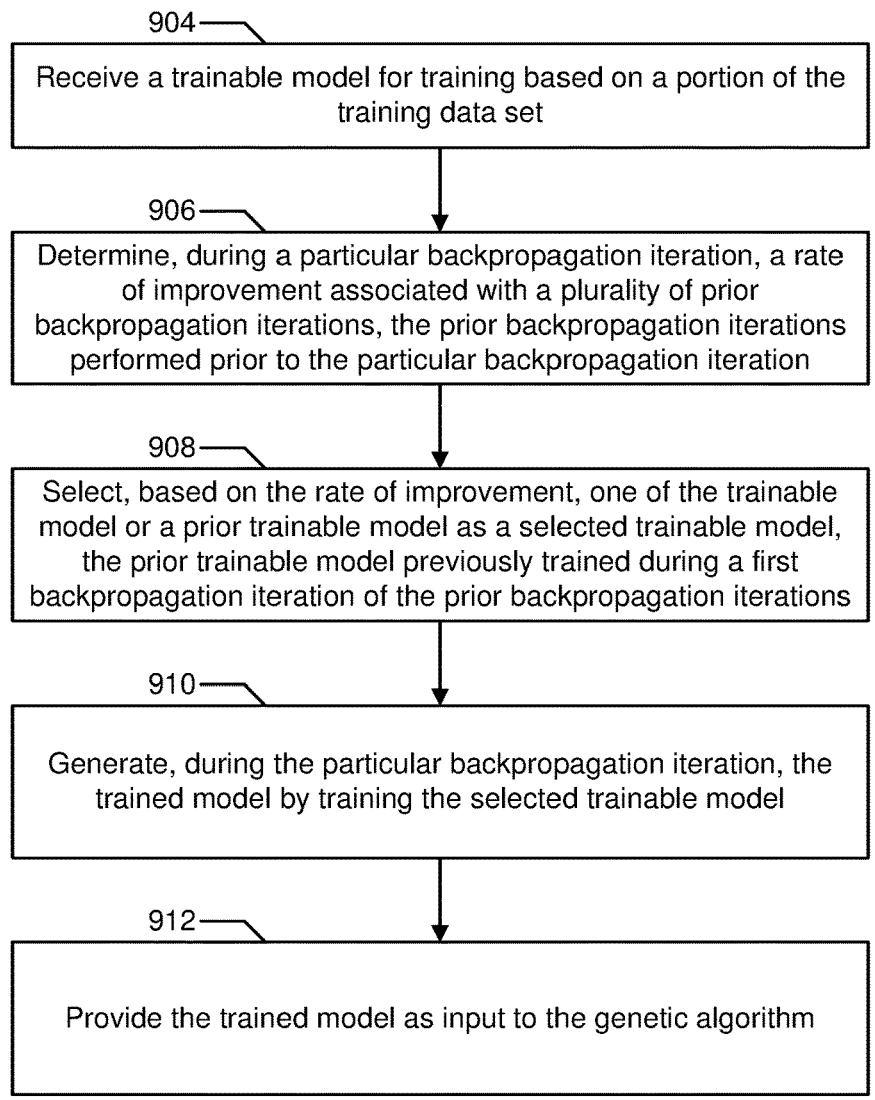
FIG. 9 illustrates a particular example of an optimization search that can be performed by a backpropagation trainer.

FIG. 9 depicts a particular example of the optimization search 186. In a particular aspect, the optimization search 186 is performed by the backpropagation trainer 180 of FIG. 1A.

The optimization search 186 includes receiving a trainable model for training based on a portion of the training data set, at 904. For example, the backpropagation trainer 180 of FIG. 1A receives the trainable model 122 for training based on a portion of the training data set 102, as described with reference to FIG. 1A.

The optimization search 186 also includes determining, during a particular backpropagation iteration, a rate of improvement associated with a plurality of prior backpropagation iterations, at 906. For example, the backpropagation trainer 180 of FIG. 1A determines, during a particular backpropagation iteration, an improvement brought about by that backpropagation iteration. By tracking per-iteration improvements, a rate of improvement associated with multiple backpropagation iterations (e.g., the current iteration and one or more previously performed iterations) can be determined, as described with reference to FIG. 1A.

The optimization search 186 further includes selecting, based on the rate of improvement, one of the trainable model or a prior trainable model as a selected trainable model, at 908. For example, the backpropagation trainer 180 of FIG. 1A selects, based on the rate of improvement, one of the trainable model 122 or a prior trainable model, as described with reference to FIG. 1A. The prior trainable model was previously trained during a first backpropagation iteration of the first backpropagation iterations.

The optimization search 186 also includes generating, during the particular backpropagation iteration, the trained model by training the selected trainable model, at 910. For example, the backpropagation trainer 180 of FIG. 1A generates, during the particular backpropagation iteration, the trained model 182 by training the selected trainable model, as described with reference to FIG. 1A.

The optimization search 186 further includes providing the trained model as input to the genetic algorithm, at 912. For example, the backpropagation trainer 180 of FIG. 1A provides the trained model 182 as input to the genetic algorithm 110, as described with reference to FIG. 1A.

Selecting the prior trainable model for training "rolls back" the first backpropagation iterations. The optimization search 186 may reduce power consumption by selectively rolling back backpropagation iterations to avoid local minima and avoid weight vectors that are not converging or not converging fast enough.

In conjunction with the described aspects, a computer system includes a memory, a processor, and an optimization trainer. The memory is configured to store a training data set and a plurality of data structures. Each of the plurality of data structures includes data representative of a neural network. The processor is configured to execute a recursive search. Executing the recursive search includes, during a first iteration of the recursive search: determining a fitness value for each of the plurality of data structures based on at least a subset of the training data set, selecting a subset of data structures from the plurality of data structures based on the fitness values of the subset of data structures, performing at least one of a crossover operation or a mutation operation with respect to at least one data structure of the subset to generate a trainable data structure, and providing the trainable data structure to the optimization trainer. The optimization trainer is configured, during a particular backpropagation iteration: to determine a rate of improvement associated with a plurality of prior backpropagation iterations, the prior backpropagation iterations performed prior to the particular backpropagation iteration; to select, based on the rate of improvement, one of the trainable data structure or a prior trainable data structure as a selected trainable data structure, the prior trainable data structure previously trained during a first backpropagation iteration of the prior backpropagation iterations; to generate a trained data structure, including training the selected trainable data structure based on a portion of the training data set; and to provide the trained data structure as input to a second iteration of the recursive search that is subsequent to the first iteration of the recursive search.

In conjunction with the described aspects, a method includes, based on a fitness function, selecting, by a processor of a computing device, a subset of models from a plurality of models. The plurality of models is generated based on a genetic algorithm and corresponds to a first epoch of the genetic algorithm. Each of the plurality of models includes data representative of a neural network. The method also includes performing at least one genetic operation of the genetic algorithm with respect to at least one model of the subset to generate a trainable model. The method further includes determining, during a particular backpropagation iteration, a rate of improvement associated with a plurality of prior backpropagation iterations. The prior backpropagation iterations are performed prior to the particular backpropagation iteration. The method also includes selecting, based on the rate of improvement, one of the trainable model or a prior trainable model as a selected trainable model. The prior trainable model was previously trained during a first backpropagation iteration of the prior backpropagation iterations. The method further includes generating, during the particular backpropagation iteration, the trained model by training the selected trainable model. The method also includes adding a trained model as input to a second epoch of the genetic algorithm that is subsequent to the first epoch.

In conjunction with the described aspects, a computer-readable storage device stores instructions that, when executed, cause a computer to perform operations including, based on a fitness function, selecting a subset of models from a plurality of models. The plurality of models is generated based on a genetic algorithm and corresponds to a first epoch of the genetic algorithm. Each of the plurality of models includes data representative of a neural network. The operations also include performing at least one genetic operation of the genetic algorithm with respect to at least one model of the subset to generate a trainable model. The operations further include sending the trainable model to a backpropagation trainer to generate a trained model. The backpropagation trainer generates the trained model by training, based on a rate of improvement associated with a plurality of prior backpropagation iterations, one of the trainable model or a prior trainable model. The prior trainable model was previously trained during a first backpropagation iteration of the prior backpropagation iterations. The operations also include adding the trained model received from the backpropagation trainer as input to a second epoch of the genetic algorithm that is subsequent to the first epoch.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. A computer-readable storage medium or device is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A computer system comprising:
   a memory configured to store a training data set and a plurality of data structures, each of the plurality of data structures including data representative of a neural network;
   a processor configured to execute a recursive search, wherein executing the recursive search comprises, during a first iteration of the recursive search:
   determining a fitness value for each of the plurality of data structures based on at least a subset of the training data set;
   selecting a subset of data structures from the plurality of data structures based on the fitness values of the subset of data structures;
   performing at least one of a crossover operation or a mutation operation with respect to at least one data structure of the subset to generate a trainable data structure; and
   providing the trainable data structure to an optimization trainer; and
   the optimization trainer configured to, during a particular backpropagation iteration:
   determine a rate of improvement associated with a plurality of prior backpropagation iterations, the prior backpropagation iterations performed prior to the particular backpropagation iteration;
   select, based on the rate of improvement, one of the trainable data structure or a prior trainable data structure as a selected trainable data structure, the prior trainable data structure previously trained during a first backpropagation iteration of the prior backpropagation iterations;
   determine a learning rate based on a difference between an error measure and a non-zero error threshold, wherein a weight of a connection is updated based at least in part on the learning rate;
   generate a trained data structure, including training the selected trainable data structure based on a portion of the training data set; and
   provide the trained data structure as input to a second iteration of the recursive search that is subsequent to the first iteration of the recursive search.

2. The computer system of claim 1, wherein the optimization trainer and the recursive search are executed on a single device.

3. The computer system of claim 2, wherein the single device is integrated into a sensor of a plurality of sensors, and wherein the training data set is generated by the plurality of sensors.

4. The computer system of claim 1, wherein the optimization trainer is executed on a different device, graphics processing unit (GPU), processor, core, thread, or any combination thereof, than the recursive search.

5. The computer system of claim 1, wherein the optimization trainer is further configured to train the selected trainable data structure including:
   determining a node error measure of a node of the selected trainable data structure;
   determining an error measure based at least in part on the node error measure; and
   selectively updating a weight of a connection of the node based on determining that the error measure is greater than a non-zero error threshold.

6. The computer system of claim 1, wherein the first iteration of the recursive search is performed with a first set of weights, wherein the second iteration of the recursive search is performed with a second set of weights, and wherein the optimization trainer is further configured to generate a third set of weights for a third iteration of the recursive search prior to execution of the first iteration of the recursive search.

7. The computer system of claim 5, wherein the optimization trainer is configured to determine the error measure based on node error measures of a plurality of nodes of the trainable data structure, and wherein the plurality of nodes includes the node.

8. The computer system of claim 5, wherein the node is included in a layer of the trainable data structure, and wherein the error measure is based on node error measures of nodes included in the layer.

9. The computer system of claim 1, wherein the processor is further configured to:
   receive an input data point; and
   based on determining that a difference between the input data point and a reference point satisfies a training threshold, add the input data point to the training data set.

10. The computer system of claim 9, wherein the processor is further configured to determine the reference point based on a plurality of data points of the training data set, and wherein each of the input data point and the plurality of data points are associated with the same classifier result.

11. The computer system of claim 9, wherein the difference between the input data point and the reference point corresponds to a distance between the input data point and the reference point in a vector space.

12. The computer system of claim 1, wherein executing the recursive search further comprises, during a first iteration of the recursive search:
grouping the data structures of the plurality of data structures into species based on genetic distance between the data structures;
determining a species fitness value of each of the species; and
selectively removing one or more species from the crossover operation or the mutation operation responsive to determining that the one or more species satisfy a stagnation criterion.

13. A method comprising:
based on a first set of weights, executing, at a first device, one or more first iterations of an optimization process with respect to a model that includes data representative of a neural network;
determining, at the first device, a rate of improvement associated with the one or more first iterations of the optimization process;
responsive to the rate of improvement failing to satisfy a threshold, executing, at the first device, the optimization process on the model using a second set of weights that differs from the first set of weights;
executing, at the first device, one or more third iterations of the optimization process based on a third set of weights prior to executing the one or more first iterations; and
providing a processed neural network to a second device distinct from the first device, the processed neural network based on the second set of weights, wherein the second device is configured to perform functions utilizing the processed neural network without performing the optimization process on the processed neural network.

14. The method of claim 13, wherein the optimization process includes determining a learning rate based on a difference between an error measure and a non-zero error threshold, and wherein a weight of a connection is updated based at least in part on the learning rate.

15. The method of claim 13, wherein second set of weights are the same as the third set of weights.

16. The method of claim 13, wherein the rate of improvement corresponds to a difference between a first result from executing the one or more first iterations and a second result from executing the one or more third iterations.

17. The method of claim 16, wherein the difference corresponds to a particular difference in a number of errors in the first result and a third result from executing the one or more third iterations.

18. The method of claim 13, wherein the optimization process comprises updating connection weights of the model but not a topology or activation functions of the model.

19. A non-transitory computer-readable storage device storing instructions that, when executed, cause a computer to perform operations comprising:
based on a first set of weights, executing one or more first iterations of an optimization process with respect to a model that includes data representative of a neural network, wherein the optimization process includes determining a learning rate based on a difference between an error measure and a non-zero error threshold, and wherein a weight of a connection is updated based at least in part on the learning rate;
determining a node error measure of a node of the model;
determining an error measure based at least in part on the node error measure;
selectively updating a weight of a connection of the node based on determining that the error measure satisfies an error threshold; and
providing a processed neural network to a second device distinct from the computer, the processed neural network based on the second set of weights, wherein the second device is configured to perform functions utilizing the processed neural network without performing the optimization process on the processed neural network.

20. The non-transitory computer-readable storage device of claim 19, wherein a second weight of a second connection of the model is not updated responsive to determining that a second error measure does not satisfy the error threshold.

* * * * *